(12) United States Patent
Yap et al.

(10) Patent No.: US 10,247,999 B1
(45) Date of Patent: Apr. 2, 2019

(54) ELECTRO-OPTIC MODULATION STRUCTURES

(71) Applicant: HRL Laboratories, LLC, Malibu, CA (US)

(72) Inventors: Daniel Yap, Newbury Park, CA (US); James H. Schaffner, Chatsworth, CA (US)

(73) Assignee: HRL Laboratories, LLC, Malibu, CA (US)

( * ) Notice: Subject to any disclaimer, the term of this patent is extended or adjusted under 35 U.S.C. 154(b) by 30 days.

(21) Appl. No.: 15/495,859

(22) Filed: Apr. 24, 2017

Related U.S. Application Data

(62) Division of application No. 14/081,962, filed on Nov. 15, 2013, now Pat. No. 9,664,931.

(60) Provisional application No. 61/727,632, filed on Nov. 16, 2012.

(51) Int. Cl.
| | |
|---|---|
| *G02F 1/035* | (2006.01) |
| *G02F 1/225* | (2006.01) |
| *G02F 1/01* | (2006.01) |

(52) U.S. Cl.
CPC .......... *G02F 1/2255* (2013.01); *G02F 1/011* (2013.01); *G02F 1/035* (2013.01); *G02F 2201/126* (2013.01)

(58) Field of Classification Search
CPC ........ G02F 1/2255; G02F 1/011; G02F 1/035; G02F 2201/126
USPC .......................................................... 385/3
See application file for complete search history.

(56) References Cited

U.S. PATENT DOCUMENTS

| | | |
|---|---|---|
| 6,628,850 B1 | 9/2003 | Yao |
| 7,171,076 B2 | 1/2007 | Shibata |
| 7,224,869 B2 | 5/2007 | Cole et al. |
| 7,262,902 B2 | 8/2007 | Burns et al. |
| 7,426,326 B2 | 9/2008 | Moeller et al. |
| 7,471,853 B2 | 12/2008 | Sugiyama |
| 8,897,614 B2 | 11/2014 | Suzuki et al. |
| 9,291,837 B1 | 3/2016 | Yap |
| 9,664,931 B1 | 5/2017 | Yap et al. |
| 2001/0004411 A1 | 6/2001 | Yariv |

(Continued)

FOREIGN PATENT DOCUMENTS

| | | |
|---|---|---|
| EP | 1372280 A2 | 12/2003 |
| JP | 05181028 A | 7/1993 |
| JP | 2003315752 A | 11/2003 |

OTHER PUBLICATIONS

Bortnik, et al., "Electrooptic Polymer Ring Resonator Modulation up to 165GHz" IEEE Journal of Selected Topics in Quantum Electronics, vol. 13, No. 1, Jan./Feb. 2007, p. 104-110.

(Continued)

*Primary Examiner* — Jerry M Blevins
(74) *Attorney, Agent, or Firm* — Ladas & Parry

(57) ABSTRACT

An electro-optic modulation structure comprises a first electrode and a second electrode and a first electro-optic strip; wherein the first electrode has a slab portion and a first ridge protruding from the slab portion of the first electrode, and the second electrode has a slab portion and a first ridge protruding from the slab portion of the second electrode, the first protruding ridge of the first electrode and the first protruding ridge of the second electrode being disposed on opposite sides of the first electro-optic strip and both protruding ridges abut the first electro-optic strip.

20 Claims, 25 Drawing Sheets

(56) References Cited

U.S. PATENT DOCUMENTS

| | | | | |
|---|---|---|---|---|
| 2004/0008916 | A1* | 1/2004 | Ridgway | G02F 1/0136 385/2 |
| 2004/0114845 | A1* | 6/2004 | Cheung | G02F 1/0356 385/2 |
| 2008/0317399 | A1 | 12/2008 | Sugiyama | |
| 2009/0074346 | A1 | 3/2009 | Peyghambarian et al. | |
| 2010/0053490 | A1 | 3/2010 | Kang et al. | |
| 2010/0209038 | A1 | 8/2010 | Popovic | |
| 2014/0010493 | A1 | 1/2014 | Kondo et al. | |
| 2014/0086523 | A1* | 3/2014 | Block | G02F 1/065 385/3 |

OTHER PUBLICATIONS

Green, et al., "Hybrid InGaAsP—InP Mach-Zehnder Racetrack Resonator for Thermooptic Switching and Coupling Control" Optics Express vol. 13 No. 5, Mar. 7, 2005, p. 1651-1659.

Sacher et al., "Characteristics of Microring Resonators with Waveguide-Resonator Coupling Modulation", Journal of Lightwave Technology, vol. 27 No. 17, Sep. 1, 2009, p. 3800-3811.

Sacher et al., "Dynamics of microring resonator modulators" Optics Express, vol. 16 No. 20, Sep. 29, 2008, p. 15741-15753.

Tazawa, et al., "Ring Resonator-Based Electrooptic Polymer Traveling-WaveModulator", Journal of Lightwave Technology, vol. 24 No. 9, Sep. 2006, p. 3514-3519.

Yariv, "Critical Coupling and Its Control in Optical Waveguide-Ring Resonator Systems", IEEE Photonics Technology Letters, vol. 14 No. 4, Apr. 2002, p. 483-485.

Zhou et al., "Silicon electro-optic modulators using p-i-n diodes embedded 10 microdiameter microdisk resonators" Optics Express, vol. 14, No. 15, Jul. 24, 2006, p. 6851-6857.

Zhou et al., "Low-Drive Power Asymmetric Mach-Zehnder Modulator with Band-Limited Operation," Journal of Lightwave Technology, vol. 9, No. 6, Jun. 1991, pp. 750-753.

From U.S. Appl. No. 13/679,921 (now U.S. Pat. No. 9,291,837) Non-Final Office Action dated Jan. 28, 2015.

From U.S. Appl. No. 13/679,921 (now U.S. Pat. No. 9,291,837) Non-Final Office Action dated Jul. 28, 2015.

From U.S. Appl. No. 13/679,921 (now U.S. Pat. No. 9,291,837) Notice of Allowance dated Nov. 20, 2015.

From U.S. Appl. No. 13/679,921 (now U.S. Pat. No. 9,291,837) Notice of Allowance dated Dec. 14, 2015.

From U.S. Appl. No. 14/081,962 (now U.S. Pat. No. 9,664,931) Restriction Requirement dated Sep. 28, 2015.

From U.S. Appl. No. 14/081,962 (now U.S. Pat. No. 9,664,931) Non-Final Office Action dated Mar. 9, 2016.

From U.S. Appl. No. 14/081,962 (now U.S. Pat. No. 9,664,931) Final Office Action dated Sep. 22, 2016.

From U.S. Appl. No. 14/081,962 (now U.S. Pat. No. 9,664,931) Advisory Action dated Dec. 7, 2016.

From U.S. Appl. No. 14/081,962 (now U.S. Pat. No. 9,664,931) Notice of Allowance dated Jan. 25, 2017.

U.S. Appl. No. 13/679,921, filed Nov. 16, 2012, Moeller.

U.S. Appl. No. 14/081,962, filed Nov. 15, 2013, Yap et al.

U.S. Appl. No. 61/727,632, filed Nov. 16, 2012, Yap et al.

Wang, et al., "Push-pull poled polymer Mach-Zehnder modulators with a single microstrip line electrode," IEEE Photonics Technology Letters, vol. 11, No. 1, Jan. 1999, pp. 51-53.

Shi. et al., "Low half wave voltage electrooptic polymer modulators: design and fabrication," Part of the SPIE Conference on Second-Order Organic Nonlinear Optics II, vol. 3796•0277-786X/99 (Jul. 1999), pp. 336-344.

P. Rabiei and W. H. Steier. "Lithium niobate ridge waveguides and modulators fabricated using smart guide," Applied Physics Letters, vol. 86 (2005), p. 161115-1-161115-3.

R. Song and W. H. Steier ("Overlap integral factor enhancement using buried electrode structure in polymer MachZehnder modulator," Applied Physics Letters, vol. 92 (2008), p. 031103).

R. Song, et al. ("Analysis and demonstration ofMach-Zehnder polymer modulators using in-plane coplanar waveguide structure," IEEE J Quantum Electronics, vol. 43 (2007), p. 433).

Noguchi, et al. (see "Millimeter-wave Ti—LiNb03 optical modulators," J Lightwave Technology, vol. 16, No. 4 (1998), p. 615).

J.H. Shin, S. Wu and N. Dagli ("35-GHz bandwidth, 5-V-cm drive voltage, bulk GaAs substrate removed electrooptic modulators," IEEE Photonics Technology Letters, vol. 19, No. 18 (2007), p. 1362).

S. Akiyama, et al. ("Wide-wavelength-band (30 nm) 1 0-Gb/s operation of InP-based Mach-Zehnder modulator with constant drive voltage of2 Vpp," IEEE Photonics Technology Letters, vol. 17, No. 7 (2005).p. 1408).

K. Tsuzuki, et al. ("A 40-Gb/s InGaAlAs—InAlAs MQW n-i-n Mach-Zehnder modulator with a drive voltage of2.3 V." IEEE Photonics Technology Letters, vol. 17, No. 1 (2005), p. 46).

* cited by examiner

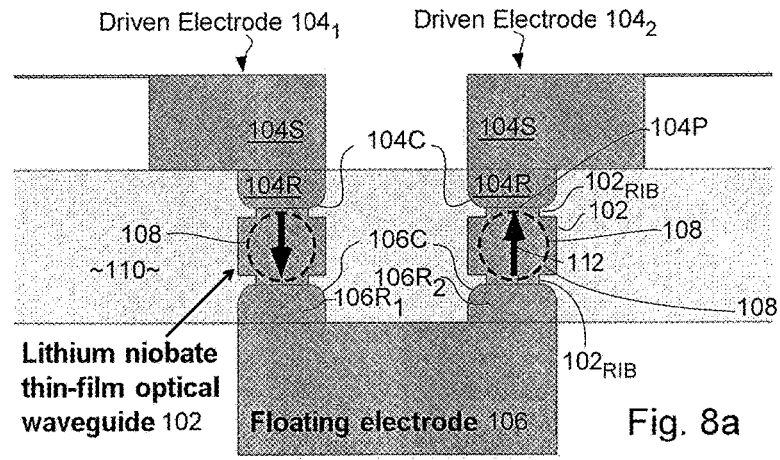
Fig. 8a
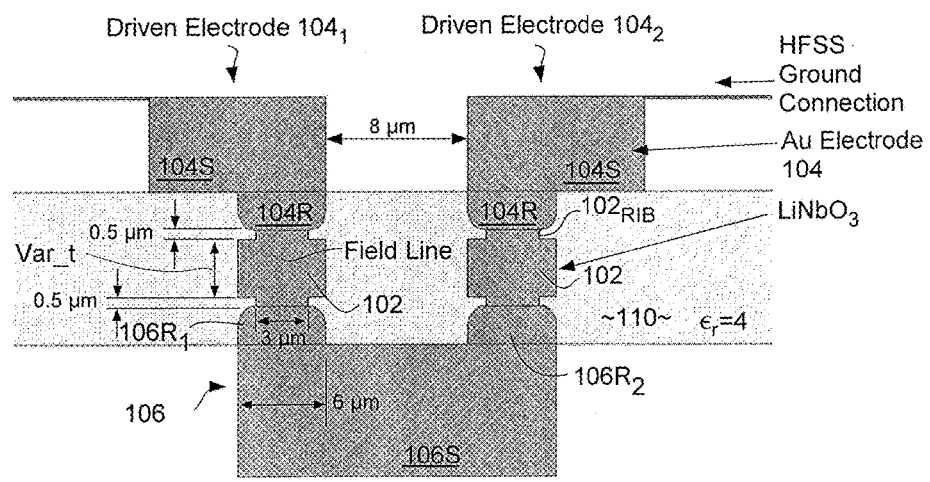
Fig. 8b  All dimensions may be modified as needed or desired and are stated in µm on this figure Electrode loss @ 40 GHz: 3.0 dB/cm
E-?led in EO slice: 1200 V/mm
Effective RF dielectric constant: 4.4
Characteristic impedance: 45Ω

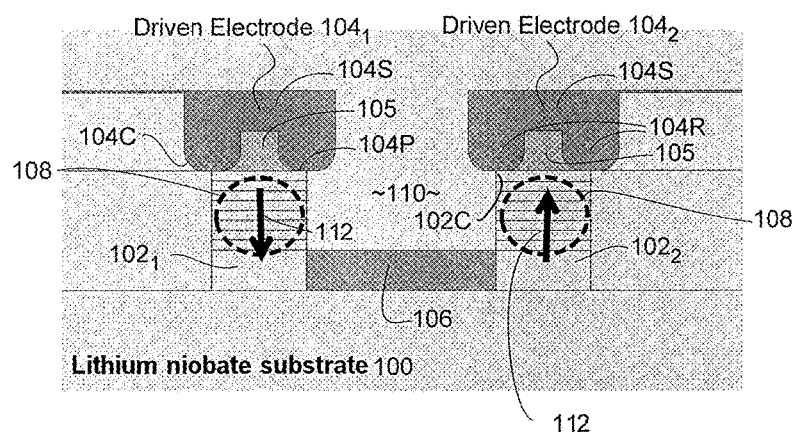
Fig. 9a
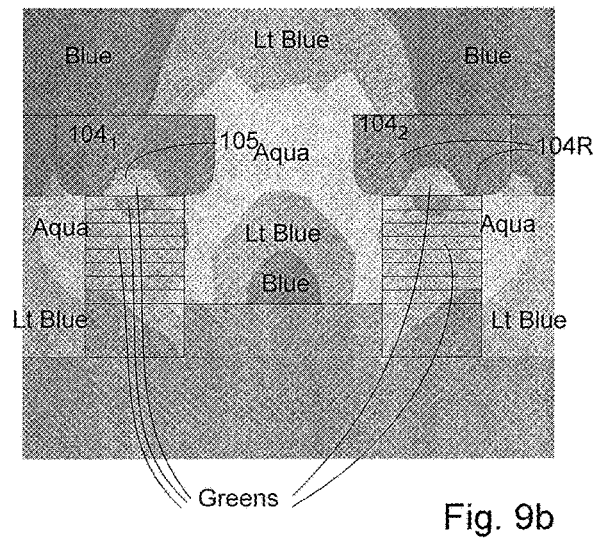
Fig. 9b
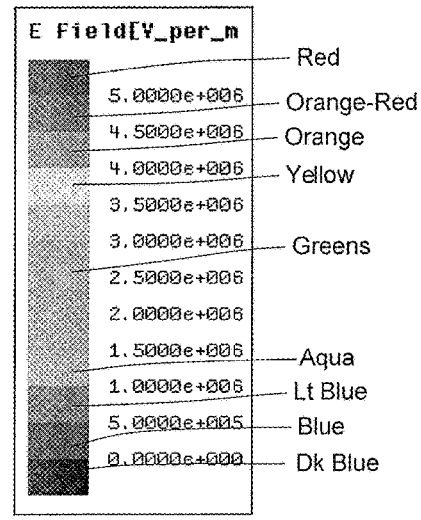

Co-planar strip electrode structure with floating electrode

Floating electrode in trench between to ribon-ridge LiNbO₃ waveguides

Driven electrodes above ridge waveguides $104_1$, $104_2$ 106  106

Floating electrode in trench

LiNbO₃ rib-on-ridge waveguides

Fig. 14b  All dimensions may be modified as needed or desired and are stated in μm on this figure Electrode loss @ 40 GHz: 2.7 dB/cm
E-filed in EO slice: 2500 V/mm
Effective RF dielectric constant: 2.3
Characteristic impedance: 45Ω

Electrode loss @ 40 GHz: 4.6 dB/cm
E-field in EO strip (core): 720 V/mm
E-field in EO strip (cladding): 4,800 V/mm
Effective RD Dielectric const.: 2.32
Char. Impedance: 33.5 Ω

These dimensions and material characteristics may be modified as needed or desired

US 10,247,999 B1

ELECTRO-OPTIC MODULATION STRUCTURES

CROSS REFERENCE TO RELATED APPLICATIONS

This application claims the benefit of and is a divisional of U.S. patent application Ser. No. 14/081,962 filed on Nov. 15, 2013, which claims the priority of U.S. Provisional Patent Application Ser. No. 61/727,632, filed on 16 Nov. 2012 and entitled, "Electro-optic Modulation Structures", the disclosures of which is are hereby incorporated herein by reference in their entireties.

This application is related to U.S. patent application Ser. No. 13/679,921, filed on 16 Nov. 2012 and entitled "Re-circulation Enhanced Electro-Optic Modulator", the disclosure of which is hereby incorporated herein by reference in its entirety.

TECHNICAL FIELD

This application relates to improvements in Electro-Optic (EO) modulators.

BACKGROUND

Electro-Optic (EO) modulators are useful for applications such as fiber-optic communications (i.e., the telecom industry) particularly if they are power-wise efficient. A reduction in modulator drive power can mean lower cost since lower power (and hence less expensive) electronics can be used to drive and control such modulators, thereby reducing the overall cost of the transmitters in fiber-optic networks. For modulators having sufficiently low full-scale drive voltage (approximately 1-2 volts), those modulators can be driven directly by low-power, low-noise electronic circuits implemented in, for example, InP, CMOS and bi-CMOS technologies. Voltage-efficient EO modulators also will improve the RF-to-RF gain and reduce the noise figure of analog RF-photonic links. Such analog links are useful for many analog cable TV systems as well as for the RF-over-fiber distribution systems being implemented for wireless (e.g., wideband cellular telephone) communications networks. Analog RF-photonic links also are useful for defense-related antenna remoting applications, for photonic control of antenna beams, and in photonic methods for RF signal processing (such as analog-to-digital conversion). Also, digital photonic links, especially ones that can interface directly to low-power electronic circuits, are useful for sensor remoting applications.

A typical Mach-Zehnder interferometric modulator has input light that is split between two EO waveguides. The refractive index of the electro-optically active material in one or both of these two EO waveguides is modulated by a voltage waveform applied to electrodes that are electro-optically coupled to the EO waveguides. The applied voltage produces a change in the electric field (or E-field) across the modulated EO waveguide. The refractive index of the EO material can be varied by varying the E-field at the EO material. The refractive-index modulation is proportional to $0.5n^3 r \Delta E$, where n is the optical refractive index of the EO material, r is the EO modulation coefficient of the EO material and $\Delta E$ is the change in the E-field at the EO material. The phase of the light at the output end of each phase-modulation arm is modulated by modulating the refractive-index of the material in that arm. The Mach-Zehnder interferometer combines the light output from the ends of its two phase-modulation arms in such a way that the intensity of the combined output light depends on the relative phases of the light in the two arms. When a Mach-Zehnder modulator is modulated in push-pull manner, a given applied voltage produces a positive change in the refractive index of one of the phase-modulation arms and produces a negative change in the refractive index of the other phase-modulation arm. With push-pull modulation, the relative EO phase change $\Delta\phi_{p-p}$ produced at the output ends of the two phase-modulation arms is given by:

$$\Delta\varphi_{p-p} = (2\pi/\lambda)n^3 r 2\Gamma \Delta EL,$$

where L is the length of the actively modulated portion of the phase-modulation arms and $\lambda$ is the wavelength of the light whose phase is being modulated. $\Gamma$ describes the percentage overlap between the optical field of the light being modulated and the active EO material whose refractive index is being changed according to the E-field, $\Delta E$, resulting from the applied modulation-control voltage.

One way to achieve this push-pull modulation is by having opposite poling of the EO materials in the two phase-modulation arms. Essentially, the EO modulation coefficient is positive for one arm but is negative for the other arm. Another way to achieve push-pull modulation is to have an electrode structure that produces an E-field that is oriented in one direction in one phase-modulation arm and is oriented in the opposite direction in the other phase-modulation arm, with the EO materials in both arms poled in the same direction. When the two phase-modulation arms have the same poling, the electro-optic dipoles of the EO materials in both arms are oriented in approximately the same direction. However, then the two phase-modulation arms have opposite poling, the electro-optic dipoles of the EO material in one phase-modulation arm are oriented in the opposite direction from the orientation of the electro-optic dipoles of the EO material in the other phase-modulation arm.

A prior art EO modulator with two oppositely poled EO waveguides is described in articles by W. Wang, et al. ("Push-pull poled polymer Mach-Zehnder modulators with a single microstrip line electrode," *IEEE Photonics Technology Letters*, vol. 11, no. 1, January 1999, pp. 51-53) and by Y. Shi, J. H. Bechtel and W. Wang ("Low halfwave voltage electrooptic polymer modulators: design and fabrication," *Proceedings of SPIE*, Volume 3796 (1999), pp. 336-344). This Mach-Zehnder interferometric modulator has polymer EO material in its two phase-modulation arms poled in opposite directions, as illustrated in FIG. 1a (the poling directions are indicated by the arrows in the solid boxes which solid boxes represent the polymer EO material). The modulator has a microstrip line electrode with a narrower strip conductor located on the top surface and a wider ground conductor located between the optical waveguiding structure and the substrate. The optical waveguide of each phase-modulation arm contains a shallow-rib waveguide embedded in cladding layers, as shown in FIG. 1b. The thickness of the guiding layer is approximately 1.5 μm to 2.5 μm and the overall distance between the two electrodes of the microstrip line is approximately 10 μm. In order to achieve an electrode impedance of 50 Ohms, which is often desirable for matching to the impedance of the modulation drive or control electronics, the ratio between the width of the top electrode strip and the thickness of the dielectric layer (which includes the optical guiding layer and the two cladding layers) should be approximately 3 to 4, for the polymer dielectric material of this modulator. The strip electrode on top must be sufficiently wide to cover both optical waveguides (i.e., both waveguide arms of the interferometer). These requirements constrain the minimum separation between the two electrodes of the microstrip line for this modulator. The smallest electrode separation reported in these articles is 7.3 µm.

The lateral extent of each EO waveguide is defined by the shallow rib formed in the guiding layer (see FIG. 1b). A disadvantage of this prior art modulator is that since its electrodes contact the entire outer surfaces of the upper cladding and the lower cladding layers, including the entire space between the two EO waveguides, a substantial amount of the modulating RF field still is applied in the regions away from these optical waveguides and away from the shallow ribs formed in the guiding layer. This inefficient use of the applied RF field reduces the modulation efficiency of this prior art modulator. Although the guiding layer comprises an EO material, the upper cladding and lower cladding of these prior art modulators, which are needed to produce optical waveguiding and to confine the guided light away from the metal electrodes, are not comprised of an EO material. However, the waveguided light (or the optical mode of the waveguide) extends substantially into those cladding layers. Thus, only a smaller percentage of that light can be modulated as a result of changes in the refractive index of only the guiding layer, thereby further degrading the modulation efficiency. The thickness of each of the two cladding layers is at least as large as the thickness of the guiding layer. Thus, at most 20-30% of the applied E-field actually overlaps the EO material of this structure.

Another prior electro-optic modulator is described in an article by P. Rabiei and W. H. Steier ("Lithium niobate ridge waveguides and modulators fabricated using smart guide," *Applied Physics Letters*, Vol. 86 (2005), p. 161115). FIG. 2 illustrates the structure of a phase-modulation arm, which has a thin slice of lithium niobate ($LiNbO_3$) EO material that is bounded on its upper and lower sides by layers of $SiO_2$ and further bounded by two metal electrodes. The difference between the refractive index of $LiNbO_3$ and the refractive index of the $SiO_2$ cladding materials in these modulators is large. Thus the vertical size of the guided optical mode in this structure is much smaller than the size of the optical mode in the waveguide of Wang and Shi. As a result of the smaller optical mode size, the metal electrodes can be placed closer to the $LiNbO_3$ EO layer. In contrast, the polymer EO material of the modulator of Wang and Shi has a smaller difference between its refractive index and the refractive index of its cladding layers, so the electrodes of the microstrip line must be farther apart. The overall separation between the two electrodes of the modulator of P. Rabiei and W. H. Steier is only 2.7 µm. However, the total thickness of the $SiO_2$ layers is approximately 2.05 µm and occupies most of this electrode-to-electrode separation. Since the microwave dielectric constant of $LiNbO_3$ is approximately 30 but the microwave dielectric constant of $SiO_2$ is approximately 4, only 4% of the applied voltage is dropped across the $LiNbO_3$ material, with the rest of that applied voltage being dropped across the two $SiO_2$ layers. Also, because the $LiNbO_3$ layer is quite thin, a large portion of the guided light extends into the $SiO_2$ material, which is not electro-optically active; as a result, the modulation efficiency is reduced.

For the modulator of P. Rabiei and W. H. Steier, a shallow rib is formed in the Z-cut $LiNbO_3$ slice to provide some lateral confinement of the optical-waveguided light. The height of this rib is 0.15 µm compared to the 0.5 µm thickness of the portions of the $LiNbO_3$ slice adjacent to that rib. The layers of $LiNbO_3$ and $SiO_2$ as well as the electrodes extend in the lateral direction far beyond the width of the shallow rib. A disadvantage of this modulator is that since its electrodes contact the entire outer surfaces of the upper $SiO_2$ cladding and the lower $SiO_2$ cladding, a substantial amount of the modulating RF field still is applied laterally in the regions away from the optical waveguides and away from the ribs formed in the $LiNbO_3$. This inefficient use of the applied RF field reduces the modulation efficiency of this prior modulator.

Another prior art EO modulator, described in articles by R. Song and W. H. Steier ("Overlap integral factor enhancement using buried electrode structure in polymer Mach-Zehnder modulator," *Applied Physics Letters*, Vol. 92 (2008), p. 031103) and by R. Song, et al. ("Analysis and demonstration of Mach-Zehnder polymer modulators using in-plane coplanar waveguide structure," *IEEE J. Quantum Electronics*, Vol. 43 (2007), p. 433), is a Mach-Zehnder modulator structure with two EO phase-modulation arms that each comprise an EO polymer core region that is shaped as inverted optical ridge waveguide. The EO polymer core is covered above and below by polymer cladding layers whose optical refractive index is somewhat lower than the optical refractive index of the core material. The core-to-cladding index difference is typically 0.1. The height of the inverted ridge in this prior art structure is 2 µm, which is much greater than the height of the ribs formed in the structures of Rabiei and Steier, of Wang et al., and of Shi et al. However, the difference between the refractive index of the core material and the refractive index of the cladding material is relatively small. Thus, the lateral size of the optical mode is fairly large and the spacing between the electrodes of this structure, which are located at the lateral sides of the EO waveguides was set to 15 µm, to minimize the optical loss from those metal electrodes.

Another prior art EO modulator, described in a patent by R. P. Moeller and J. H. Cole ("Low loss bridge electrode with rounded corners for electro-optic modulators," U.S. Pat. No. 7,426,326) and in a patent by J. H. Cole, R. P. Moeller and M. M. Howerton ("Low loss electrodes for electro-optic modulators," U.S. Pat. No. 7,224,869), is a Mach-Zehnder interferometric modulator whose lithium niobate EO material in its two phase-modulation arms are poled in opposite directions. This modulator has a center electrode that includes a pair of protruding portions that point toward and abut a pair of optical waveguides formed in a lithium niobate substrate, as shown in FIG. 3a. In the structure of Moeller and Cole (see FIG. 3a), the protrusions of the center electrode have rounded corners but in the structure of Cole, et al. (see FIG. 3b), the protrusions of the center electrode have square corners. Both of these protruding portions of the center electrode are located on a common top side of the optical waveguides. These two optical waveguides are the two phase-modulation arms of the interferometer. The center electrode with the protruding portions functions as the center conductor of a coplanar-waveguide (CPW) RF transmission line structure. Ground electrodes are disposed on either lateral side of the center electrode. Since both the active, center electrode and the ground electrodes of this CPW electrode structure are located on a common side of the optical waveguides but both optical waveguides are located only beneath the center electrode, the modulating E-field lines must also traverse large regions of lithium niobate substrate that are outside of the optical waveguides. The voltage dropped across these regions outside the optical waveguides does not contribute to the modulation of the light.

Each of the optical waveguides of this prior art modulator is formed in an optical ridge structure that protrudes from the substrate of Z-cut lithium niobate EO material. Because of the high RF dielectric constant of the $LiNbO_3$ EO material, the optical ridges help to direct a greater percentage of the RF electric-field lines through the optical waveguides. Also, the two protrusions in the center electrode direct much of the E-field lines through the two optical waveguides that are located beneath those protrusions and away from the portions of the center electrode that is between those two optical waveguides, to improve the modulation efficiency achieved with this structure. These two prior art patents describe a Mach-Zehnder interferometric modulator in which the two optical waveguides of the pair have their EO material poled in opposite directions. But since the optical waveguides of this prior modulator are quite thick, the poling must remain relatively uniform over the greater thickness of those optical waveguides. This constraint limits how close the two optical waveguides can be spaced from each other, since the direction of the poling of the Z-cut lithium niobate substrates gradually departs from being perpendicular to the surface as the distance from that surface (generally the surface facing the metal electrodes) increases. Thus, the two oppositely poled optical waveguides are spaced far apart and the center electrode must be quite wide. To main a desired impedance, such as 50 Ohms, for the coplanar-waveguide transmission line formed from this center electrode and two ground electrodes, the lateral spacing between the center electrode and a ground electrode is large. As a result, substantial voltage is dropped across the regions outside the optical waveguides and does not contribute to the modulation of the light in the waveguides.

In the structures of Moeller and Cole and of Cole, et al., a low-refractive-index oxide buffer layer is located between the center electrode and the lithium niobate waveguide beneath that electrode in order to reduce the optical attenuation by confining the waveguided light away from the light-absorbing metal material. This oxide buffer, whose dielectric constant is much smaller than the dielectric constant of lithium niobate, further reduces the E-field intensity at the optical waveguide that would result from a voltage applied between the center electrode and a ground electrode. Most prior lithium niobate modulators have an oxide buffer layer between the metal electrode and the lithium niobate EO material of the optical waveguide. Since the lithium niobate waveguides are generally formed by diffusing some material such as titanium into a lithium niobate substrate through the top surface of that substrate, the region of higher refractive index is located near the top of that waveguide structure. Addition of a buffer (or cladding) layer of a material such as silicon dioxide, which has a much lower optical refractive index than lithium niobate, confines the guided light further into the lithium niobate material and away from the metal electrode that is on the opposite side of that buffer layer, to reduce the unwanted absorption of the guided light by the metal electrode. However, much of the applied voltage can be dropped across the buffer layer, because of the low dielectric constant of that buffer in comparison to the dielectric constant of lithium niobate, and thus the E-field at the optical waveguide is reduced.

FIG. 4a shows an electrode structure for a Mach-Zehnder interferometric modulator that is described by Noguchi, et al. (see "Millimeter-wave Ti—$LiNbO_3$ optical modulators," *J. Lightwave Technology*, vol. 16, no. 4 (1998), p. 615). With this prior art structure, the center-conductor electrode of the CPW transmission-line lies above one phase-modulation arm and one of the ground electrodes lies above the other phase-modulation arm. As a result, an applied voltage produces E-field vectors that have opposite polarity in the two arms, resulting in push-pull modulation even though the EO materials of both arms have the same poling. Since the CPW structure has E-field lines that go between one center electrode and two ground electrodes, which are on the two lateral sides of the center electrode, the E-field strength at the EO waveguide that is near the ground electrode of this prior structure is only approximately one-half the E-field strength at the EO waveguide that is near the center electrode. Thus, the overall push-pull modulation efficiency is reduced. FIG. 4b shows results obtained by Noguchi, et al. that describe the dependence of a modulator voltage figure-of-merit, $V_\pi L$ and the dependence of the electrode characteristic impedance on the thickness of the oxide buffer. These results indicate that the thick buffer layer is helpful for achieving a value for the electrode impedance that is matched to 50 Ohms. These results also show that $V_\pi L$ increases as the buffer layer is made thicker. The value for $V_\pi$, the applied voltage required to achieve π phase shift for a phase modulator length of L, is higher for a thicker buffer because the E-field at the EO waveguide is lower.

A prior art electrode structure for a modulator constructed from III-V semiconductor EO material is illustrated in FIG. 5 and is described in an article by J. H. Shin, S. Wu and N. Dagli ("35-GHz bandwidth, 5-V-cm drive voltage, bulk GaAs substrate removed electrooptic modulators," *IEEE Photonics Technology Letters*, vol. 19, no. 18 (2007), p. 1362). This structure achieves, inherently, a push-pull drive configuration such that the changes in the refractive index of the EO material in the two EO waveguide arms of a Mach-Zehnder interferometer have opposite sign when a voltage is applied to the electrode. Each EO waveguide has one electrode located above it and another electrode located beneath it. Thus the light in the waveguide can experience the maximum E-field, for voltage-efficient modulation. The electrode structure of the two EO waveguides is a coplanar waveguide (CPW) RF transmission line whose center or signal electrode is electrically connected to the electrode located on top of a first of the two EO waveguides but is electrically connected to the electrode located beneath the second EO waveguide. This connection of the signal electrode, together with having one ground electrode of the CPW transmission located beneath the first EO waveguide and the other ground electrode of the CPW transmission line located above the second EO waveguide, achieves the push-pull drive. However, such an electrode configuration requires that the original substrate of the modulator material be removed in order to provide the necessary access to both the top and the bottom sides of the EO waveguides. Also, a portion of the metal electrode must extend from the top of the structure to the bottom of the structure, which complicates their fabrication process.

Another prior art III-V semiconductor modulator achieves push-pull modulation without needing to have its substrate removed (unlike the structure of FIG. 5) and also without needing to have oppositely poled EO material (unlike the structures of FIGS. 1a and 3a). This prior art structure is illustrated in FIG. 6 and is described in a paper by S. Akiyama, et al. ("Wide-wavelength-band (30 nm) 10-Gb/s operation of InP-based Mach-Zehnder modulator with constant drive voltage of 2 $V_{pp}$," *IEEE Photonics Technology Letters*, vol. 17, no. 7 (2005), p. 1408). For this structure, the thickness of the multiple-quantum-well (MQW) optical waveguide core is 0.5 μm. The slotline electrode of this structure places one metal electrode over one arm of the Mach-Zehnder interferometric modulator and the other metal electrode over the other arm of that optical interferometer. The n-InP lower cladding layer serves as an electrically conductive path between those two metal electrodes. The p-InP upper cladding layer, which is present only above the MQW core region of each EO waveguide arm, also is electrically conductive. Thus, the modulation voltage is established primarily across the MQW core regions of the two arms and the E-field lines are pointed in opposite directions in the two optical-waveguide arms. This structure can achieve voltage efficient push-pull modulation because the gap between the conductive cladding layers is small. However, the overall modulation efficiency of a modulator depends not only on the voltage efficiency but also on the overlap between the optical mode of the light to be modulated and the active EO material. For this prior modulator, only the MQW core region of the waveguide has its refractive index modulated by the applied voltage. But a large portion of the optical mode overlaps the electrically conductive cladding regions instead of overlapping the undoped MQW core region. Thus, the modulation efficiency is degraded.

The semiconductor modulator of FIG. 6 has a conductive n-InP cladding layer that provides an electrically shunting path between the two driven electrodes of the slotline that are located at the top of the modulator. However, because the values for the dielectric constant of the semiconductor material at microwave or millimeter-wave frequencies and at optical frequencies are similar, the series electrical connection of two capacitances that occurs because of the shunting path actually makes the velocity match of the optical and RF waves poorer. Thus, the slotline electrode structure of this prior modulator of FIG. 6 needs to add capacitively loading segments of the RF transmission line in order to increase the velocity of the RF wave to match the velocity of the optical wave. The EO modulation structure of this prior modulator is placed only in capacitively loading segments of the RF transmission line. The modulation of the waveguided light occurs only in these capacitively loading sections and there is no modulation of the light occurring in the segments of EO waveguide between these capacitively loading portions. As a result, the overall length of the modulator must be increased. According to the article by Akiyama, et al., the fractional length of the modulated portion of each phase modulation arm is 0.56. The modulation structure of FIG. 5 likewise can be formed in only a portion of the overall length of the phase-modulation arms of the Mach-Zehnder modulator if 50 Ohm impedance and velocity match also are desired. According to the article by Shin, Wu and Dagli, the fractional length of the modulated portion of the phase-modulation arm is only 0.47 when the structure achieves both 50 Ohms impedance and velocity match between the optical and RF waves. Thus, the modulation efficiency for these two modulators is poorer by approximately a factor of two compared to a structure that can have its EO waveguide interact with the entire length of the electrode structure.

To provide a point of comparison to the prior art push-pull modulation structures described above, FIGS. 7a and 7b illustrate another prior electrode structure constructed from III-V semiconductor materials. This structure is described in a paper by K. Tsuzuki, et al. ("A 40-Gb/s InGaAlAs—InAlAs MQW n-i-n Mach-Zehnder modulator with a drive voltage of 2.3 V," *IEEE Photonics Technology Letters*, vol. 17, no. 1 (2005), p. 46). This prior art modulator does not have a push-pull electrode structure and, instead, two separate voltage waveforms of opposite polarity must be applied to the electrodes of its two phase-modulation arms in order to achieve push-pull modulation. Thus, the power of the input modulation signal would need to be doubled since that modulation signal is used to produce two separate modulation-control waveforms, with one of those modulation-control waveforms delivered to each of the two phase-modulation arms. This structure has separate RF coplanar-waveguide (CPW) transmission line electrodes associated with each of the two arms of the Mach-Zehnder interferometer modulator. For each arm of the interferometer, the active or signal electrode is located above the optical waveguide, which is formed as a tall ridge etched from the semiconductor material, and the return or ground electrodes of the RF coplanar-waveguide transmission line are located beside the tall ridge. The waveguide core region, comprising a multiple-quantum-well (MQW) structure, is sandwiched between lower refractive-index cladding layers that consist of a combination of a semi-insulating InP layer and an n-doped InP layer combination or that consists of just an n-doped InP layer. The n-doped InP layers are electrically conductive and thus the modulating E-field is established across the combined thickness of the MQW active layer and the semi-insulating InP layer, which gives a total thickness of 1.3 µm. The electro-optic modulation coefficient of MQW material is substantially higher than the electro-optic modulation coefficient of its constituent III-V semiconductor materials. With this structure, the full-scale modulation voltage ($V_\pi$ for a Mach-Zehnder modulator) is reduced to a value of 2.2 volts, with that voltage applied to only one of the two phase-modulation arms, which have a length of only 3 mm. A weakness of this prior art structure is that since its EO waveguide ridge comprises semiconducting material, the sides of the semiconductor ridge must be covered with a dielectric spacer, such as BCB, which limits the minimum size of the gap that can be formed between a signal electrode and its associated ground electrode.

The optical loss of the III-V semiconductor modulators that have MQW EO waveguide core regions is quite high. The article of Akiyama et al, reported an optical insertion loss of 10 dB for their Mach-Zehnder modulator that has the modulation structure of FIG. 6 and a length of 3.6 mm for its phase-modulation arms. The article of Tsuzuki et al. did not even provide a number for the optical loss of its modulation structure. For comparison, the optical propagation loss of the EO phase-modulation arms of the structure of FIG. 5 is only approximately 3 dB/cm. The structure of FIG. 5 has undoped, bulk AlGaAs/GaAs/AlGaAs EO material instead of an MQW core layer and doped cladding layers.

The electro-optic modulation coefficient of III-V semiconductor EO material is quite small (generally 1-2 µm/volt) and is much smaller than the electro-optic modulation coefficient of LiNbO$_3$ EO material (which has a value of approximately 30 µm/volt) or of temperature-stable EO polymer material (which can have a value as large as 50-100 µm/volt). To compensate for its small electro-optic modulation coefficient, the electrode gap for a III-V semiconductor structure must be made very small (compared to the gap in LiNbO$_3$ modulators and in many EO polymer modulators) in order to achieve a reasonably low full-scale modulation voltage, $V_\pi$, and also conductive cladding layers are needed to establish that narrow gap. Such a construction is accompanied by deficiencies such as the following. The overlap of the optical field with the modulating E-field is poor since the optical field extends far into the conductive cladding whose refractive index is not modulated (because there is negligible voltage drop across the conductive cladding, and thus negligible E-field). There is unwanted optical attenuation from the conductive cladding because of free-carrier absorption of the light, especially in p-type cladding. There also is poor coupling of the waveguided light in the modulator with the light in an optical fiber to which the modulator may be connected (because the size of the optical mode in those semiconductor EO waveguides is so small).

Lithium niobate has a large electro-optic coefficient compared to InP-based and GaAs-based III-V materials. However, voltage efficient electrode structures like those developed for the III-V modulators have not been used for lithium niobate modulators. One reason is that III-V materials are semiconductors and thus electrically conductive optical waveguide cladding layers can be formed using those III-V materials. In contrast, lithium niobate is an electrical insulator. There are no electrically conductive materials that can be used with lithium niobate and that also have reasonably high optical transparency for the 1550 nm wavelength light typically used in optical links that contain the modulators. For example indium tin oxide absorbs light having wavelengths longer than 1000 nm. Furthermore, any potential transparent and conductive cladding would not contribute to the modulation of the percentage of the guided light whose mode distribution overlaps the cladding material, since there would be negligible voltage drop across that conductive material.

Polymer EO modulators suffer from some of the same limitations as lithium niobate in that conductive polymers with good transparency to 1550 nm wavelength light are not available. Thus, the cladding layers of typical polymer modulators are insulating. Also, typical polymer cladding materials that have low optical loss are not electro-optically active.

The oxide buffer layer of the prior lithium niobate modulators serves as a one-side cladding layer that reduces the overlap of the guided light with the metal electrodes above it, to reduce the optical loss. The additional voltage drop across this oxide buffer layer reduces the E-field level at the EO material underneath that oxide buffer, thereby reducing the voltage efficiency of the modulator.

For lithium niobate EO modulation structures whose electrodes are electrically connected in series, like the prior structure of Noguchi, et al., the width of the center conductor of the CPW transmission line is approximately equal to the width of the EO waveguide under it. For this prior structure, a thickness of approximately 1 µm is desirable for the oxide layer, even though that thicker oxide layer reduces the modulation efficiency and increases the value for $V_\pi L$. In contrast to the series-configured structures, the effective width of the center conductor of the EO modulation structures whose electrodes are electrically connected in parallel is at least doubled, even when that center conductor has protrusions that extend toward the EO waveguide ridges, as in the structures of Moeller and Cole. One might expect that a larger inter-electrode gap or an even thicker oxide layer would be needed for such a parallel-configured structure to achieve a characteristic impedance of approximately 50 Ohms and also to even approach achieving a velocity match for the propagating RF and optical fields.

The path traversed by the E-field lines from the center conductor to the ground electrodes of a CPW transmission line passes not only through the EO waveguides beneath the center conductor but also through additional lithium niobate material beneath and to the sides of those EO waveguides. The E-field strength resulting from an applied voltage is inversely proportional to the length of the path between the electrodes across which that voltage is applied. To improve the modulation efficiency, it is desirable to reduce the path of the E-field lines, in opposition to the practice required for the CPW transmission lines with wide center conductors.

The electrode-to-electrode gaps achievable with the lithium niobate modulation structures of FIGS. 3a, 3b and 4a are much larger than the size of the optical mode for the light in the EO waveguides. Thus, much of the applied voltage is dropped in a voltage-inefficient manner in portions of the lithium niobate substrate that do not contain the light to be modulated.

BRIEF DESCRIPTION OF THE INVENTION

In one aspect the present invention provides an electro-optic modulation structure comprising a first electrode and a second electrode and an electro-optic strip of dielectric electro-optic material; wherein the first electrode has a slab portion and a metallic ridge protruding from the slab portion of the first electrode, and the second electrode has a slab portion and a metallic ridge protruding from the slab portion of the second electrode, the protruding metallic ridge of the first electrode and the protruding metallic ridge of the second electrode being disposed on opposite sides of the electro-optic strip and both protruding metallic ridges abutting and contacting the electro optical material of the electro-optic strip and being in substantial alignment with each other.

In another aspect the present invention provides a method of increasing the sensitivity of an electro optic modulator by: disposing metallic electrodes in direct contact with a slice of electro optical material which, in use, supports an optical mode; and shaping at least one of the metallic electrodes and said slice of electro optical material to move or confine the optical mode therein away from said metallic electrodes.

In still yet another aspect the present invention provides an electro-optic modulation structure comprising a first strip of electrically insulating electro-optic material and a second strip of electrically insulating electro-optic material, a first electrode, a second electrode and a third electrode; wherein the first electrode, the second electrode and the third electrode are physically distinct from each other; and wherein the first electrode contacts a portion of the first strip of electro-optic material, the second electrode contacts a portion of the second strip of electro-optic material.

In yet another aspect the present invention provides a Mach-Zehnder interferometer optical modulator comprising a pair of optical waveguides, wherein a first optical waveguide includes a first strip of dielectric electro-optic material and a second optical waveguide includes a second strip of dielectric electro-optic material, the first and second strips of dielectric electro-optic material being physically separated from each other, a first metal electrode in direct contact with dielectric electro-optic material of the first strip of electro-optic material, a second metal electrode in direct contact with electro-optic material of the second strip of electro-optic material and a third metal electrode in direct contact with electro-optic material of both the first strip and the second strip of electro-optic material.

BRIEF DESCRIPTION OF THE DRAWINGS

FIG. 8a depicts an embodiment of a series configured electro-optic modulation structure while FIG. 8b shows some exemplary dimensions for the series configured electro-optic modulation structure of FIG. 8a and FIG. 8c shows an example of a calculated E-field profile for this embodiment based on the dimensions set forth in FIG. 8b.

FIG. 9a depicts one embodiment of a series configured electro-optic modulation structure while FIG. 9b depicts a calculated E-field profile for this embodiment.

FIG. 10a depicts another embodiment of a series configured electro-optic modulation structure while

FIGS. 11a and 11b show photographs of fabricated electro-optic modulation structures of the embodiment depicted in FIG. 10a.

FIG. 14b depicts a simulation model for the embodiment of FIG. 14a.

FIG. 14c shows an example of the calculated RF E-field distribution in the modulation structure of FIG. 14a.

FIG. 18a depicts a simulation model for a structure in which only the top electrode has protruding ridges and the optical waveguides are planar rather than being narrow strips. FIG. 18b shows an example of a simulated RF E-field distribution calculated for the structure of FIG. 18a.

FIG. 19b shows an example of a simulated RF E-field distribution calculated for the structure of FIG. 19a.

FIG. 21b shows an example of a simulated RF E-field distribution calculated for the structure of FIG. 21a.

DETAILED DESCRIPTION

Figure 1A:
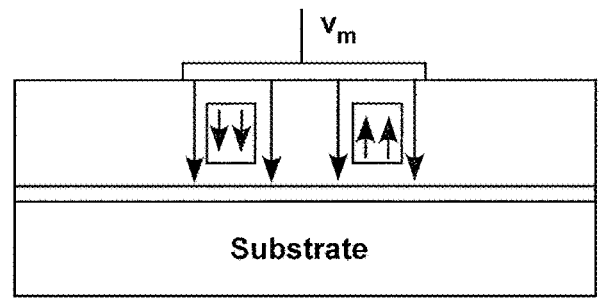
FIGS. 1a and 1b depict a prior art electro-optic modulation structure of a Mach-Zehnder interferometric modulator that has a microstrip line electrode coupled to a pair of electro-optic waveguides that are poled in opposite directions.

The push-pull electro-optic modulation structure disclosed herein is a voltage-efficient EO modulation structure that is compatible with EO waveguides comprising dielectric or electrically insulating EO materials such as lithium niobate or EO polymers. This modulation structure both can have a small inter-electrode gap and can have its modulated EO material in contact with and abutting the metal electrodes while still achieving an equivalent impedance that is approximately 50 Ohms and preferably achieving velocity match between the propagating RF and optical fields.

Compared to the prior art EO modulation structures, depicted by FIGS. 1a-7b, the presently disclosed embodiments of a modulation structure, described in the detailed description given below, offers several advantages (it being understand that not all embodiments necessarily share all of these advantages) that enable it to achieve improved modulation efficiency while making use of non-semiconductor EO materials such as lithium niobate and EO polymers. The presently disclosed modulation structure does not necessarily need to have any cladding layers of non-EO material to reduce the attenuation of the waveguided light by the metal electrodes, in contrast to prior art modulators. The presently disclosed modulation structure also does not necessarily need to have any cladding layers of electrically conductive EO material to reduce the attenuation of the waveguided light by the metal electrodes, again in contrast to prior art modulators. The EO strips in some embodiments of the presently disclosed modulation structure contain ribs etched into the outer portions of the EO strip. These ribs are preferably much narrower than the width of the optical mode of the optical waveguide. The narrow ribs "push" the optical mode, in the vertical direction (for example), into the wider part of the EO strip and away from the protruding ridges of the metal electrodes. Thus, the modulator structure of certain embodiments of this invention preferably makes use of a ribbed lithium niobate or EO polymer waveguide strip that does not need to have any separate cladding layers or low-refractive-index buffer layers of non-EO material but that, instead, can have its EO material placed directly against the metal electrodes. This makes such embodiments of the disclosed modulator very different from the prior modulators that likewise involve EO polymers, since those prior art modulators have a cladding layer that is quite thick (generally >1 µm). Also, some embodiments of the disclosed modulation structures can achieve velocity match between its optical and RF fields without needing to use an oxide buffer layer between the lithium niobate EO material and the metal electrode to facilitate that velocity matching. This makes those embodiments of the present modulator very different from the prior modulators that likewise involve z-cut lithium niobate, since those prior modulators have an oxide buffer layer that is quite thick (generally >0.5 µm).

Figure 1B:
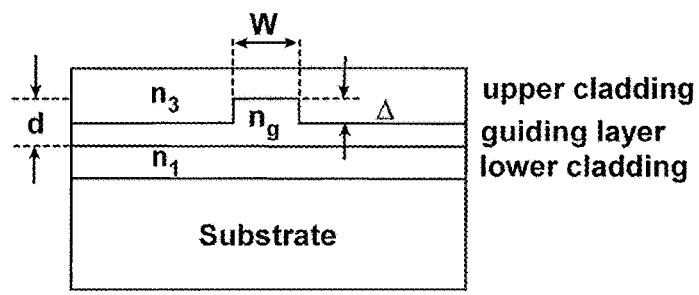
Figure 2:
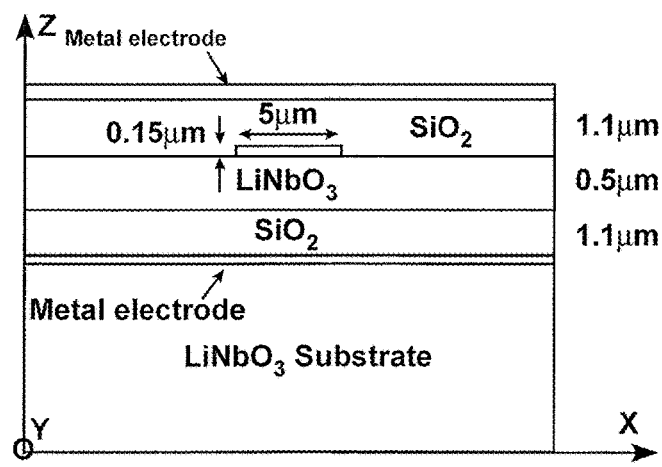
FIG. 2 illustrates the structure of a prior art phase-modulation arm, which has a thin slice of lithium niobate (LiNbO$_3$) EO material that is bounded on its upper and lower sides by layers of SiO$_2$ and further bounded by two metal electrodes.
Figure 3A:
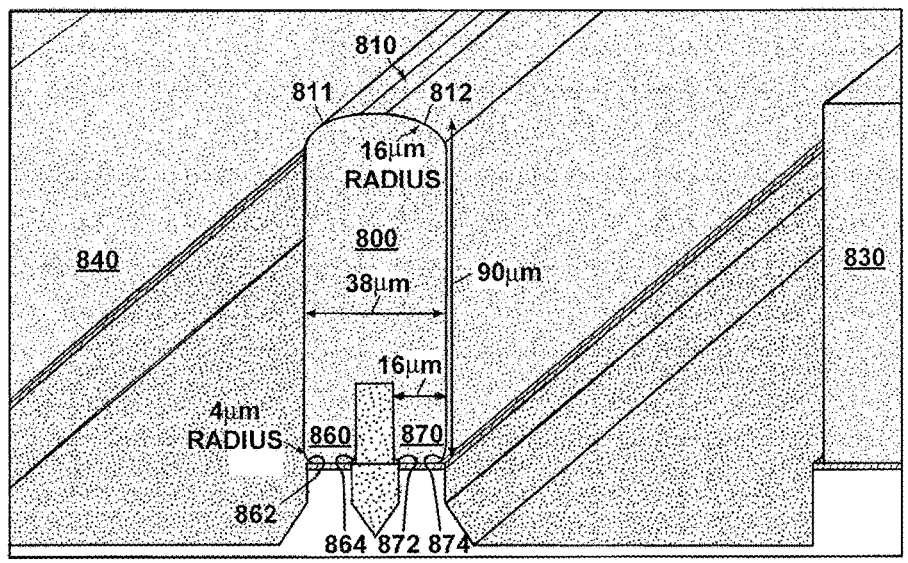
FIGS. 3a and 3b depict prior art EO modulators described in U.S. Pat. Nos. 7,426,326 and 7,224,869, in which a Mach-Zehnder interferometric modulator has lithium niobate EO material in its two phase-modulation arms which are poled in opposite directions.
Figure 3B:
Figure 3B:
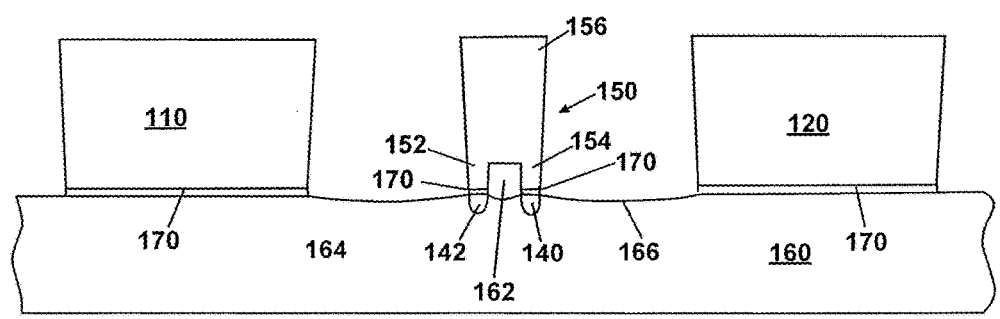
Figure 4A:
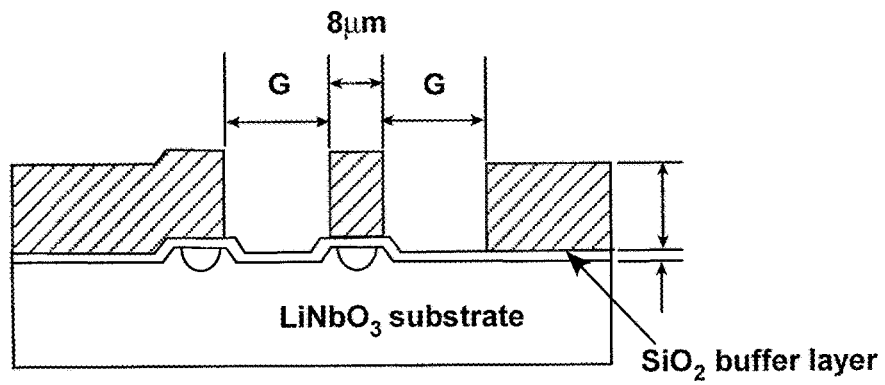
FIGS. 4a and 4b depict a prior art electrode structure and the effect of its buffer layer thickness.
Figure 4B:
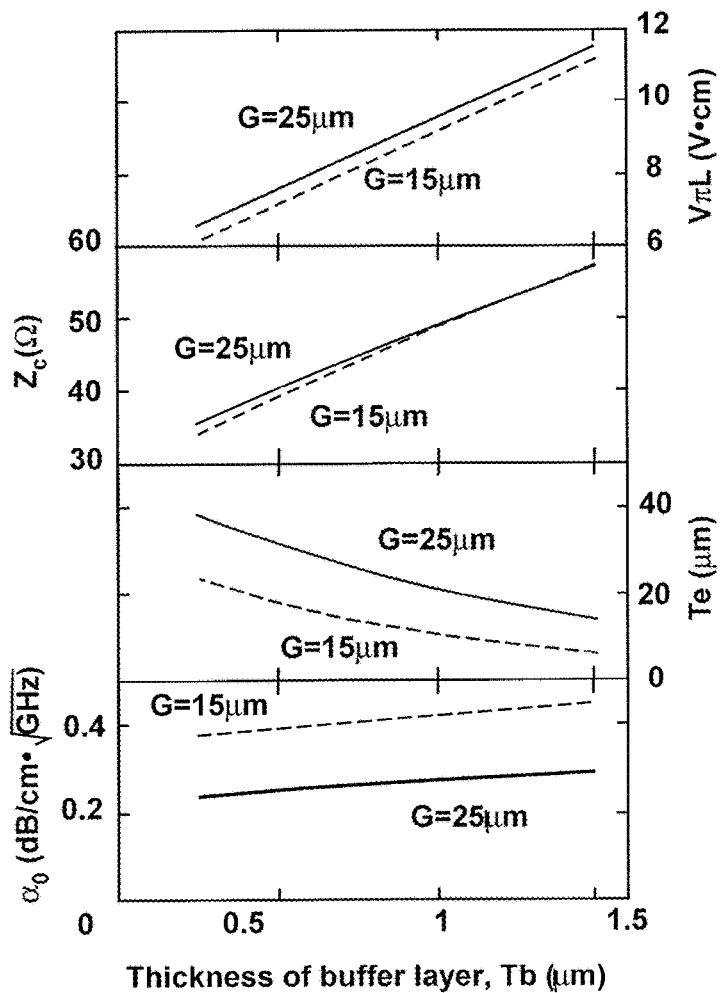
Figure 6:
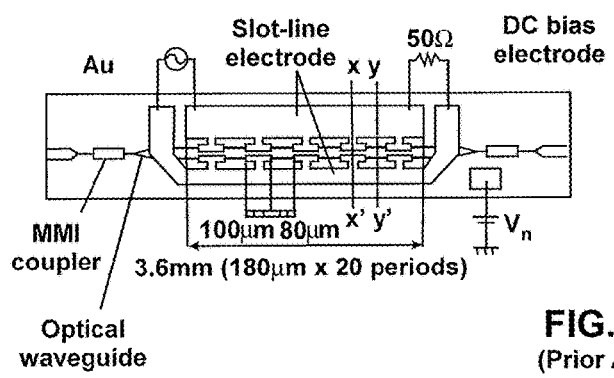
FIG. 6 depicts another prior art semiconductor modulator that achieves push-pull modulation.
Figure 6:
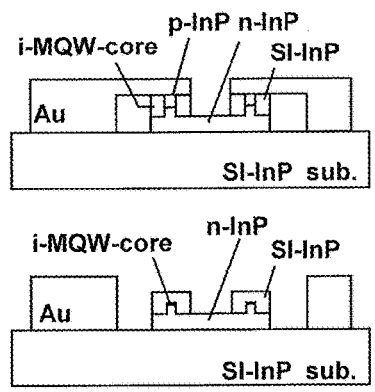
Figure 5:
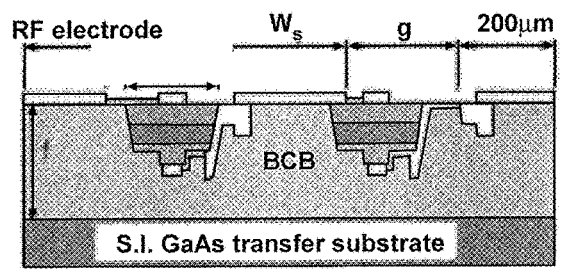
FIG. 5 illustrates a prior art electrode structure which achieves a push-pull drive configuration such that the changes in the refractive index of the EO material in the two EO waveguide arms of a Mach-Zehnder interferometer have opposite signs when an electrical signal is applied to the three electrodes of this structure.
Figure 7A:
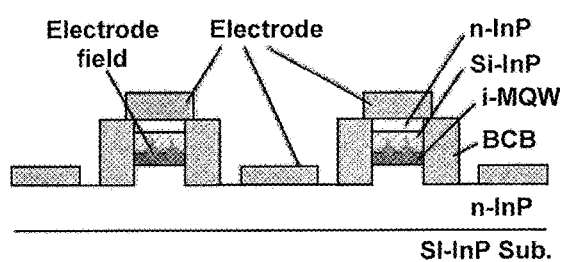
FIGS. 7a and 7b depict a prior art electrode structure of a modulator constructed from III-V semiconductor materials.
Figure 7B:
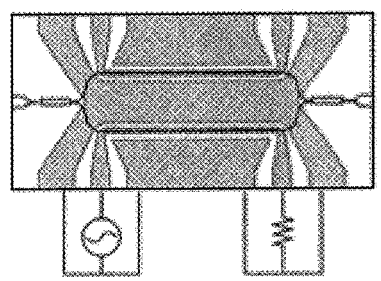

Some prior art modulators have shallow ribs in the core layer of their optical waveguides. These shallow ribs (<0.2 µm in height) have been used to define the lateral extent of the waveguided light (see the prior art of FIGS. 1b and 2 for example). However, these ribs have not been used to move the waveguided light away from the top or bottom sides of the optical waveguide structure and thus cladding layers still are needed in the prior modulators. Instead, the shallow ribs are part of the waveguide core layer, as illustrated in FIGS. 1b and 2, that is surrounded, above and below, by cladding layers. Other prior art modulators that have tall ribs in the core layer of their optical waveguides do not have electrodes located above those tall ribs but rather have electrodes that are located adjacent the lateral sides of those optical waveguides.

The presently disclosed modulation structures have each EO waveguide directly in contact with two metal electrodes or separated from the two metal electrodes by only thin (<0.2 µm thickness) layers of non-electro-optically active oxide or cladding material. In some embodiments, both of those two electrodes have one or more protruding ridges with a portion of those ridges on a first electrode of those two electrodes contacting the top side of the EO waveguide and with a portion of those ridges on the second of those two electrodes contacting the bottom side of the EO waveguide. In other embodiments, one of those electrodes contacts a lateral side of the EO waveguide and the other of those electrodes has one or more protruding ridges with a portion of those ridges on that electrode contacting the top side of the EO waveguide. These protruding ridges of the electrodes increase the E-field level at the EO waveguides. In contrast to the structures of this invention, for the prior modulation structures, the portions of EO material whose refractive index is modulated by a change in the voltage applied to the electrodes of those structures do not contact the metal electrodes of those structures directly but rather are separated from the metal electrodes above or beneath those portions of EO material by cladding or oxide regions whose thickness is at least 0.5 µm.

Some embodiments of the presently disclosed modulation structure comprise an electrically series configuration of two EO waveguides that are formed from lithium niobate EO material. For prior modulation structures that comprise semiconductor EO material, an electrically series configuration of the two phase-modulation arms makes the velocity match poorer and thus capacitively loaded RF transmission line electrodes are needed. For such capacitively loaded RF transmission lines, only a portion of the length of the electrode structure can be used to actually modulate the EO waveguides. Thus, the modulation efficiency of such capacitively located modulation structures is degraded. On the contrary, with the presently disclosed modulation structures that are implemented in lithium niobate material, an electrically series configuration can make the velocity match better. As a result, nearly the entire length of their electrode structure is used to modulate the EO waveguides.

I. Push-Pull Embodiments Having Two EO Waveguides Poled in the Same Direction

One exemplary embodiment of a push-pull modulation structure is illustrated in FIG. 8a. In this embodiment, each of two driven electrodes $104_1$ and $104_2$ has a ridge 104R which protrudes from a slab portion 104S. A tip of each protruding ridge 104R touches or abuts the top of an EO strip 102. The base of each protruding ridge 104R contacts (and may be integral with) the slab portion 104S of each electrode $104_1$, $104_2$. Each EO strip 102 is separated from its neighboring EO strip 102 in the lateral direction, although the two EO strips 102 may be connected to each other at the ends of those EO strips. This modulation structure also has a third electrode 106 (the floating electrode) that does not need to be connected directly to an external electrical circuit (not shown). Instead, the modulating voltage (or modulation control voltage) supplied from the external electrical circuit is applied across the two driven electrodes $104_1$ and $104_2$. The third electrode 106 may be electrically floating in such an embodiment (or it may be grounded or even have a bias voltage applied to it in certain embodiments). Because this third electrode 106 is located under the other two electrodes $104_1$ and $104_2$, the E-field lines between those two driven electrodes $104_1$ and $104_2$ can terminate on the floating electrode 106. Thus, the electrode 106 provides a high electrical-conductivity path that partially shunts the two driven electrodes $104_1$ and $104_2$.

The third electrode 106 preferably also has two protruding ridges $106R_1$ and $106R_2$ in this embodiment. One of these two protruding ridges $106R_1$ touches one of the two EO strips 102 and the other protruding ridge $106R_2$ touches the other of the two EO strips 102. Both of these protruding ridges $106R_1$ and $106R_2$ contact the slab portion 106S of the electrode 106 (and may be integral therewith). All of the protruding electrode ridges preferably have rounded corners 104C and 106C with a flat portion 104P of the protruding electrode ridges (between adjacent rounded corners) facing and preferably contacting an EO strip 102. Each EO strip 102 preferably has a rib $102_{RIB}$ located on its top side, with the rib $102_{RIB}$ defining a mesa facing and contacting the flat bottom surface portion 104P located between the rounded corners 104C of the protruding ridge 104R of a driven electrode 104. Each EO strip 102 preferably also has a rib 102$_{RIB}$ located on its bottom side, with the rib defining a second mesa, the second mesa facing and preferably contacting the flat top surface of a protruding ridge 1061, 1062 of the third electrode 106.

The curved corners 104C of a protruding ridge preferably extend away from the flat surface 104P of the ridge that touches the upper mesa defined by rib of the EO strip 102. The width of the protruding ridge may be equal to, greater than or smaller than the width of the EO strip. But having the width of the protruding ridge greater than the width of the EO strip at the region where that ridge touches the EO strip is preferred. Instead of having a rounded corner, a corner of the protruding ridge may have a flattened bevel or other convenient shape. In either case, the intensity of the fringing E-field is reduced as described below with reference to FIG. 8c.

With reference to FIGS. 8a, 8b, 8d, 9a, and 10a, each of the EO strips 102 is fabricated from a dielectric EO material such as lithium niobate, for example. Titanium-diffused optical waveguiding regions 108 are preferably formed in each of the EO strips 102. Titanium typically is diffused from either the top or bottom side of the EO strip 102. The diffused titanium region has a lateral extent that preferably is smaller than the width of an EO strip 102. The optical mode of the light guided in the optical waveguide is defined by the combination of the titanium-diffused region 108, the lateral sides of the EO strip 102, the top and bottom surfaces of the EO strip 102, and the two ribs 102$_{RIB}$, where the width of the titanium-diffused region 108 is less than the width of the EO strip 102. The width of a rib 102$_{RIB}$ is sufficiently narrow and the rib 102$_{RIB}$ is sufficiently shallow that the light to be modulated preferably cannot be guided within a rib 102$_{RIB}$ of the EO strip 102. Instead, the rib 102$_{RIB}$ functions to move, focus or confine the optical mode away from the top (and/or bottom) surface of the EO strip 102 and towards the center of the EO strip 102. The ribs 102$_{RIB}$ define mesas which contact upper electrodes 104$_1$ and 104$_2$.

Figure 8C:
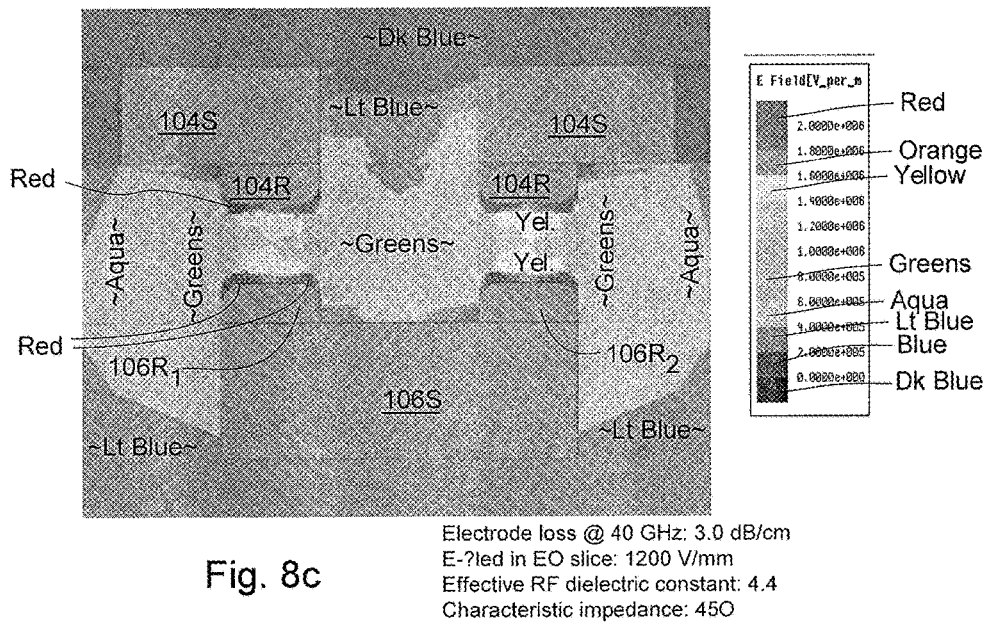
Figure 8D:
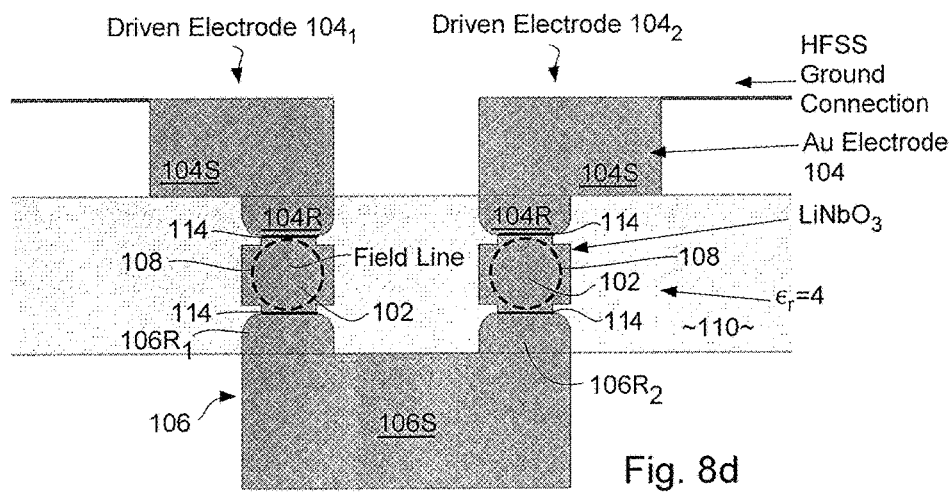
FIG. 8d is very similar to FIG. 8a, but in this embodiment thin layers of a non-EO dielectric are placed between the metallic electrodes and the EO strip.

The E-field lines are oriented in opposite directions in the two EO strips 102 as depicted by arrows 112 in the embodiment of FIG. 8a. This oppositely directed orientation of the E-field lines provides a desired push-pull modulation effect when the EO materials in the two EO strips are poled in the same orientation. The calculated E-field distribution is shown in FIG. 8c for the modulation structure with dimensions as shown in FIG. 8b. The simulation was done using HFSS®, a commercially available finite-element simulation tool from Ansoft. In the figure, the intensity of the E-field was color coded, with red representing the highest E-field intensity and dark blue representing the lowest E-field intensity. The E-field intensity is highest in the vicinity of the optical waveguides, indicating the effectiveness of the ridged electrode structure for concentrating that applied E-field into the EO material of the modulator. The protruding ridges of the electrodes and the large dielectric constant of the EO strips result in the concentration of the E-field into the EO strips and away from the space between those two EO strips. The E-field level in the EO strip is at least 0.5 times the value of the maximum E-field level in the structure. The space between the two EO strips and also to the outer sides of those EO strips in this and other embodiments could be filled with a low microwave dielectric-constant material 110 such as silicon dioxide or Teflon, or that space could be left un-filled. The dimensions depicted by FIG. 8b are exemplary and may be varied in a particular application.

It was mentioned above that the EO strip might be separated from the two metal electrodes by a thin (<0.2 μm thickness) layer of non-electro-optically active oxide or cladding material. See the embodiment of FIG. 8d where thin (each preferably <0.2 μm in thickness) layers of silicon dioxide (or some other non-EO dielectric material) 114 are placed between the electrode ridges 104R, 106R$_1$ and 106R$_2$ and the associated EO strips 102. Such an embodiment would generally be less desirable than the embodiment of FIG. 8a, for example, since the introduction of one or more layers of silicon dioxide (or some other non-EO dielectric material) 114 would tend to reduce the efficiency of the modulator, but the presence of a thin layer of silicon dioxide (or some other non-EO dielectric material) 114 might have benefits which outweigh this drawback such as making the application of biasing voltages easier.

Another exemplary embodiment of a push-pull embodiment of the modulation structure is illustrated in FIG. 9a. This embodiment preferably has two EO ridges 102$_1$ and 102$_2$ preferably formed of lithium niobate that are preferably etched or otherwise formed from or on a lithium niobate substrate 100. Above each EO ridge is a driven upper electrode structure 104$_1$, 104$_2$ preferably formed of a metal. Each of these metal electrode structures 104$_1$, 104$_2$, which preferably comprises a metal such as gold, aluminum, silver or copper, has two protruding ridges 104R that preferably have curved lower corners 104C on each lateral side of each ridge 104$_1$, 104$_2$, preferably with a small flat region 104P between the curved lower corners 104C. The size of flat portion 104P may be zero so that the curved lower corners 104C assume a single continuous curve. These protruding ridges 104R may be centered on the outer (and square in this particular embodiment) corners 102C of each of the EO ridges 102$_1$ and 102$_2$ in the lithium niobate substrate 100. The other end of each protruding ridge contacts a slab portion 104S of the electrode 104$_1$, 104$_2$. The space between the two protruding ridges 104R of an electrode 104$_1$, 104$_2$ is preferably filled with a low-optical refractive-index dielectric material 105 such as silicon dioxide, a low-index polymer, or a silicon nitride whose optical refractive index is lower than the optical refractive index of lithium niobate. Titanium-diffused optical waveguiding regions 108 are formed in each of the EO ridges 102$_1$, 102$_2$. The titanium is diffused (typically downward from the top of the EO ridges 102$_1$ and 102$_2$) and a diffused titanium region 108 is formed which preferably has a lateral extent that is smaller than the width of the EO ridge containing that diffused titanium region. The lateral extent of the optical mode of the light guided in each optical waveguide is defined by the combination of the titanium-diffused region 108, the sides of the EO ridge 102$_1$ or 102$_2$, the top surface of that EO ridge and the region of low-refractive-index dielectric (which functions somewhat like a waveguide rib). The height of the metal protruding ridge 104R is typically between 1 and 5 μm but could be larger. The height of the EO ridge 102$_1$, 102$_2$ is typically between 3 and 6 μm.

This embodiment of the modulation structure has a third electrode 106 that is located at the bottom of a trench formed between the two optical waveguide ridges 102$_1$ and 102$_2$. This third electrode 106 need not be directly connected to an external electrical circuit (not shown). Instead, the modulating or modulation-control voltage for the modulation structure from the external electrical circuit is preferably applied across the two driven electrodes 104$_1$ and 104$_2$. Like the embodiment of FIG. 8a, the third electrode 106 of this embodiment may be electrically floating or grounded or a bias voltage may be applied thereto. It is frequently at a floating potential, so it is often referred to as a floating electrode herein, it being understood that the floating third electrode 106 could be grounded or have a bias voltage applied thereto in certain applications. Because this third electrode 106 is located between the other two electrodes $104_1$ and $104_2$ (electric-field-wise), the E-field lines between those two driven electrodes $104_1$ and $104_2$ can terminate on the floating electrode 106. Thus, the electrode 106 provides a high electrical-conductivity path that partially shunts the two driven electrodes $104_1$ and $104_2$. Those E-field lines still extend at least partially through the two EO ridges $102_1$ and $102_2$, as desired for producing the EO modulation of the light guided in the EO ridges $102_1$ and $102_2$. However, the floating electrode 106 keeps the E-field lines from extending very deeply into the lithium niobate substrate 100, beyond the depth of the floating electrode 106. The arrows 112 depict the push-pull nature of the electric field imposed by the drive voltage applied to electrodes $104_1$ and $104_2$.

As discussed above, a dielectric region 105 can be formed between the two protruding ridges 104R of an electrode $104_1$, $104_2$ and if used, this dielectric material can be used to move the optical field, or the profile of the waveguided optical mode, away from the metal driven electrodes $104_1$, $104_2$. The E-field profile of FIG. 9b was calculated for a structure having a dielectric region 105 that is only 1 μm thick. The flat portion 104P of each protruding ridge 104R touches the upper corners 102C of an associated EO ridge or if no flat portion occurs then the pairs of curved corners 104C would be centered on the upper corners 102C of an associated EO ridge. Because the dielectric region 105 also acts to confine the optical energy of the guided light towards the middle of the EO ridge 102 and away from the lateral sides of that EO ridge 102, the optical power of the waveguided light is relatively low in the vicinity of those upper corners 102C. As a result, attenuation of the waveguided light from the absorption of that light by the electrode protrusions is minimized. The dielectric regions 105 between the tops of ridges $102_1$ and $102_2$ and the electrodes $104_1$ and $104_2$ also causes the E-field in the portions of ridges $102_1$ and $102_2$ that are directly beneath those dielectric regions 105 to be reduced slightly, as seen from the E-field distributions plotted in FIG. 10b. But the E-field distribution is quite uniform over most of the EO ridges $102_1$ and $102_2$.

It should be noted that portion 104P between corners 104C, if used, is preferably planar and that the exterior horizontal edges of the associated ridge at each corner 102C may bisect the planar portions 104P which it confronts, if desired.

Instead of placing the floating electrode 106 between the EO ridges $102_1$ and $102_2$, it could instead be placed under them and be equipped with metallic electrode ridges similar to ridges 104P but pointing upwards in FIG. 9a and contacting the bottom edges of EO ridges $102_1$ and $102_2$. A dielectric material like material 105 may be used between between each pair of such upward pointing ridges to help urge the optical field, or the profile of the waveguided optical mode, away from the metallic electrode ridges added to the floating electrode 106.

Additionally, the EO ridges $102_1$ and $102_2$ can be equipped with ribs of the type depicted in FIGS. 8a and 8b on either its top or bottom surfaces or both surfaces to help confine the optical field, or the profile of the waveguided optical mode, away from the metallic electrode ridges.

Figure 10A:
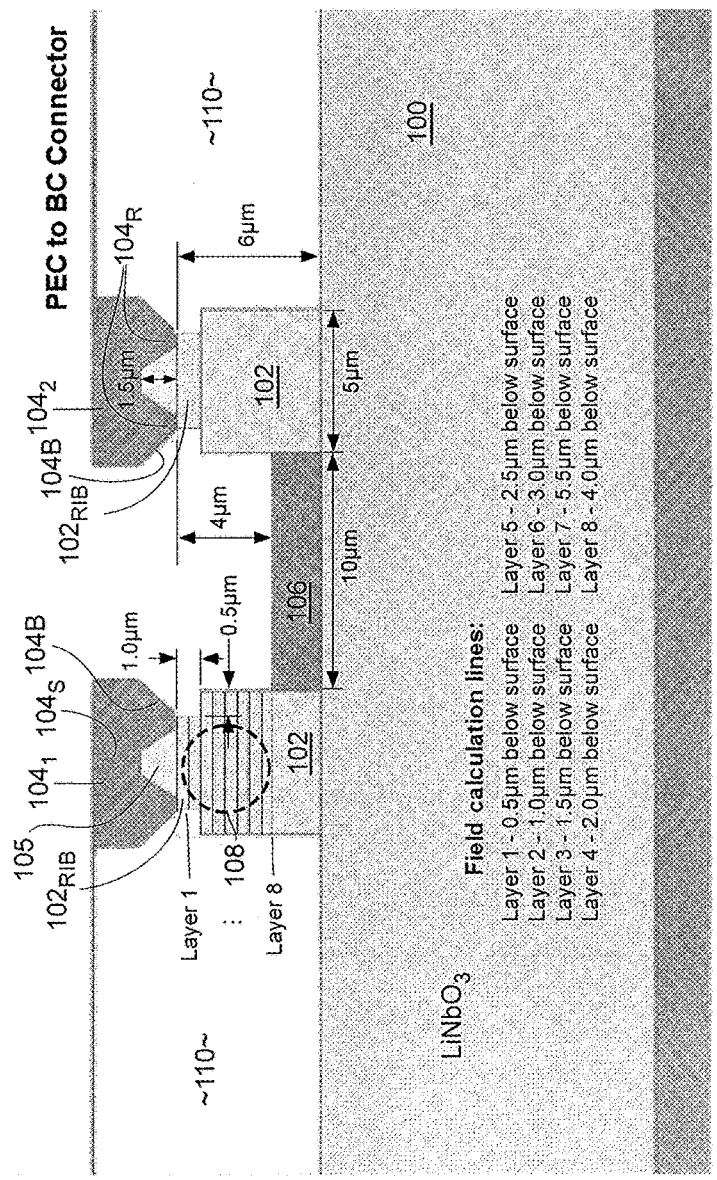

FIG. 10a shows another exemplary embodiment of a push-pull modulation structure. This embodiment has two EO strips or ridges 102, with each EO strip or ridge having a rib $102_{RIB}$ on its top side. The EO strips or ridges 102 are preferably formed of lithium niobate (LiNbO₃) and are preferably formed on or with a lithium niobate substrate 100. Each EO strip or ridge 102 may have a titanium diffused region 108 formed in it. Above each EO strip is a driven electrode $104_1$, $104_2$. Each driven electrode $104_1$, $104_2$ has two protruding ridges 104R that connect to or are integral with a common slab 104S, in this embodiment. Each protruding ridge 104R has beveled corners 104B as opposed to rounded or pointed corners (more or less similar to the rounded corners 104C of the embodiment of FIG. 8a, for example, in terms of reducing the electric field thereat, but it should be apparent that a beveled corner may well be easier to fabricate than a rounded corner). The space between the two adjacent protruding ridges 104R of a driven electrode 104 can be filled with a solid dielectric material 105 whose optical refractive index is lower than the optical refractive index of the material comprising the EO strip or ridge 102 or it can be left unfilled. Rounded corners 104C depicted in the prior embodiments are preferred from an electric field perspective, but the beveled corners 104B shown in FIG. 10a may be easier to make during manufacturing.

A floating electrode 106 is located at the bottom of a deep trench formed between the two EO strips or ridges 102. The floating electrode 106 preferably touches the side of each of the EO strips or ridges 102. The protruding ridges 104R of a driven electrode touch a portion of the top of a rib $102_{RIB}$ of an EO strip or ridge 102. This placement of the protruding ridges 104R should minimize the overlap of the optical mode guided by the EO strip or ridge with the metal of the driven electrode, and thereby minimize the optical attenuation by the metal electrode. For this exemplary embodiment, the width of the rib $102_{RIB}$ is preferably 1 μm smaller than the width of the EO strip or ridge 102 (so that the sides of each rib $102_{RIB}$ is preferably spaced 0.5 μm from the nearest sides of the major portion of the EO strip or ridge 102 and thus the width of the rib $102_{RIB}$ is 4 μm in this embodiment). However, in general, the width of the rib $102_{RIB}$ of the EO strip may have an even smaller value than this if desired. The top of the floating electrode 106 is disposed 4 μm below the top of the rib $102_{RIB}$ in this embodiment. The thickness of the driven electrodes $104_1$ and $104_2$ is 5 μm and the thickness of the floating electrode 106 is 2 μm in this example of the embodiment. All of these dimensions are exemplary and the values of any or all of these dimensions may be changed as desired. As such, other values of the dimensions given above and on FIG. 10a may also be suitably used for an improved modulation structure.

Figure 10B:
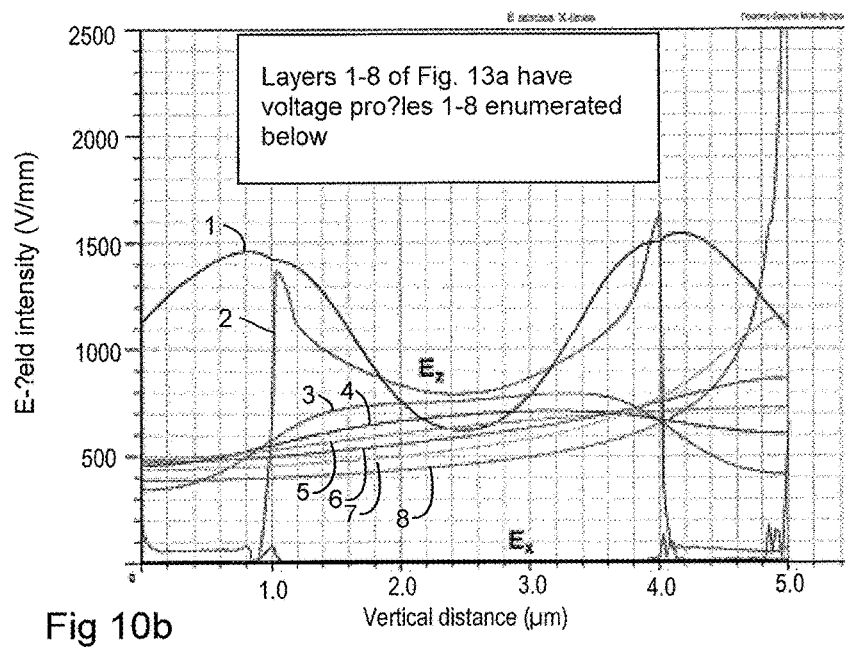
FIG. 10b shows an example of the calculated E-field profiles in the EO waveguide, determined at various values of the distance from the top of the rib.

FIG. 10b shows the lateral distribution of the E-field calculated in the EO strip or ridge 102 shown at the left side of FIG. 10a. These E-field distributions are calculated at successive depths below the top of the rib. For a depth that is in the rib, the E-field is peaked at the outer edges of the rib. Note that the driven electrode touches the rib above the outer corners of the rib. The locations of the peaked E-field are consistent with the locations of the contact between the driven electrode and the EO strip. For a depth of 4 μm, the E-field distribution is again peaked, but now at the inside (or right) edge of the EO strip or ridge 102. At this depth, a corner of the floating electrode touches the EO strip. Thus, this peaking of the E-field is consistent with the contact of the floating electrode with the EO strip and the sharp corner of that floating electrode.

In the other portions of the EO strip or ridge 102 that are below the rib, the E-field is fairly uniform across the width of the EO strip. The E-field intensity is slightly higher near the top of the EO strip (i.e., closer to the driven electrode 104), but the value of the E-field varies by only 30% over this distance of 3 μm. A strong EO modulation can be achieved for the waveguided light propagating in the EO strip 102. All of the modulating E-field simulations, whose results are shown in FIGS. 8c through 10b, were done with an input RF waveform whose power is 1 Watt. The drive voltage of the electrodes is determined from that input power value and the value of the characteristic electrode impedance.

Figure 11A:
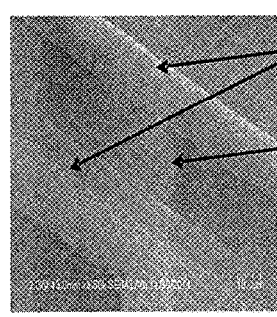
Figure 11B:
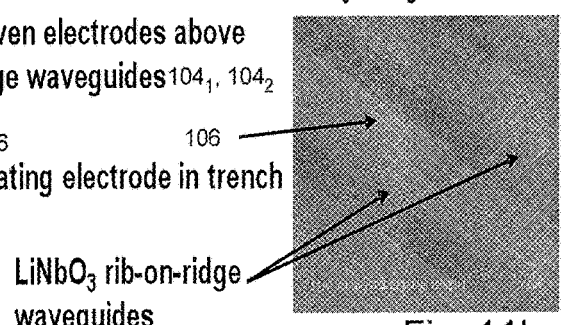

Examples of a combination of the embodiments illustrated in FIGS. 8a and 10a were fabricated from lithium niobate material. FIGS. 11a and 11b depict two photographs of fabricated modulation structures that were taken with a scanning electron microscope. FIG. 11b photograph shows two EO ridge-shaped strips 102 that have titanium-diffused regions in them. The top surfaces of those ridges are slightly rough, which is a result of the titanium diffusion. The tops of the two EO ridges 102 also have ribs formed in them, as seen from the right hand photograph. A floating electrode 106 is formed at the bottom of the deep trench between the two ridges. In some cases, the floating electrode 106 covers only the bottom of the deep trench and in other cases, the floating electrode 106 also can cover a portion of the side of an EO ridge 102. The two driven electrodes $104_1$, $104_2$ are located above the two EO ridges, and are not present in the photograph of FIG. 11b so that the ribs and the roughness from the titanium diffusion can be seen. The two driven electrodes $104_1$, $104_2$ can be seen in the photograph of FIG. 11a. A driven electrode typically is wider than the EO ridge below it. In some structures fabricated, the bottom of the driven electrode $104_1$, $104_2$ is flat and contacts the top of the rib formed on the EO ridge. In other structures fabricated, a portion of the top of the rib is covered with a region of oxide and the driven electrode $104_1$, $104_2$ contacts the two upper corners of the rib.

The RF power, P, of the RF field propagating in the electrode structure is related to the peak-to-peak RF modulation-control voltage, $V_{pp}$, by the expression $P=0.5(V_{pp}^2/Z_o)$, where $Z_o$ is the characteristic impedance of the electrode structure. The simulations assumed an input RF power level of 1 Watt. Consider the structure of FIG. 8a. For the calculated electrode impedance of 45Ω, the peak-to-peak drive voltage assumed is approximately 9.5 Volts. Note that this applied voltage actually is dropped across a series connection of two gaps, with an EO strip located within each gap.

The electro-optically induced change in the refractive index of the EO material, Δn, is proportional to $0.5n^3 r\Delta E$, where n is the refractive index at the optical wavelength (e.g., n=2.15 for LiNbO$_3$ and r is the electro-optic coefficient of the EO material (e.g., r is approximately $30 \times 10^{-12}$ m/Volt for LiNbO$_3$). An E-field level of 1200 V/mm would change the refractive index of the exemplary EO material by $1.8 \times 10^{-4}$. Assuming an optical wavelength of 1.55 μm, we can estimate the length of electrode at the phase-modulation arm that would be needed to produce a differential π phase shift between light propagated through the two phase-modulation arms of a Mach-Zehnder interferometer with the push-pull modulation structure of FIG. 8a. Note that the attenuation of a 40 GHz RF modulation-control signal propagated through the electrode is 0.3 dB/mm. The cumulative phase shift of the optical field obtained at the output end of each phase-modulation arm can be estimated by assuming an E-field value that is the average of the values at the input and the output ends of the structure. For a 40 GHz modulation control signal with an E-field strength of 1200 V/mm at the input of the phase-modulation arm, the average E-field value is approximately 1110 V/mm, assuming an electrode length of 2.3 mm. Assuming this average E-field value, the electrode length needed to produce a differential π phase shift for the Mach-Zehnder interferometer is approximately 2.3 mm, as expected for self-consistency. A figure-of-merit for electro-optic modulators is the $V_\pi L$ product. For the modulation structure of FIG. 8a with an electrode length of 2.3 mm and full-scale applied voltage of 9.5 Volts, the value for $V_\pi L$ would be 2.2 Volt-cm at 40 GHz. This can be compared with the response at a lower frequency of 20 GHz projected for the modulator of Cole et al., for which a value for $V_\pi L$ of 10.5 Volt-cm was predicted. Similarly, a value for $V_\pi L$ of nearly 10 Volt-cm was predicted for the modulation structure of Noguchi, et al. The nearly factor-of-5 lower $V_\pi L$ for the presently disclosed modulation structure compared to these prior lithium niobate modulators is a result of its more efficient usage of the modulation-control voltage applied to its electrodes. If the length of the electrodes in the modulation structure of FIG. 8a is increased to 1.5 cm, the value for $V_\pi$ at 40 GHz would be reduced to 2.0 Volts, even when the RF attenuation of the electrode is included in the estimate.

An electrically series or serial arrangement of the two EO strips in the modulation structure is useful for an EO material such as lithium niobate whose dielectric constant or refractive index at microwave and millimeter-wave frequencies is much higher than its dielectric constant or refractive index at optical frequencies. An electrically series arrangement is beneficial for achieving both velocity match (between the velocity of the modulating E-field traveling in the electrode structure and the velocity of the light propagating in the EO waveguides) and a characteristic impedance of approximately 50 Ohms for the electrode structure. The series arrangement reduces the effective capacitance of the structure that comprises lithium niobate EO strips. However, with a series arrangement, the applied voltage must be dropped across both EO waveguides. Thus, the overall path length of the E-field lines traversing between one electrode and the other is increased, typically by a factor of 2, and the E-field intensity at each EO waveguide is reduced. Nevertheless, very high E-field intensity can be achieved at each EO waveguide by using a third, floating electrode, as described in the embodiments above.

II. Push-Pull Embodiments Having Two EO Waveguides Poled in Opposite Directions

Figure 12A:
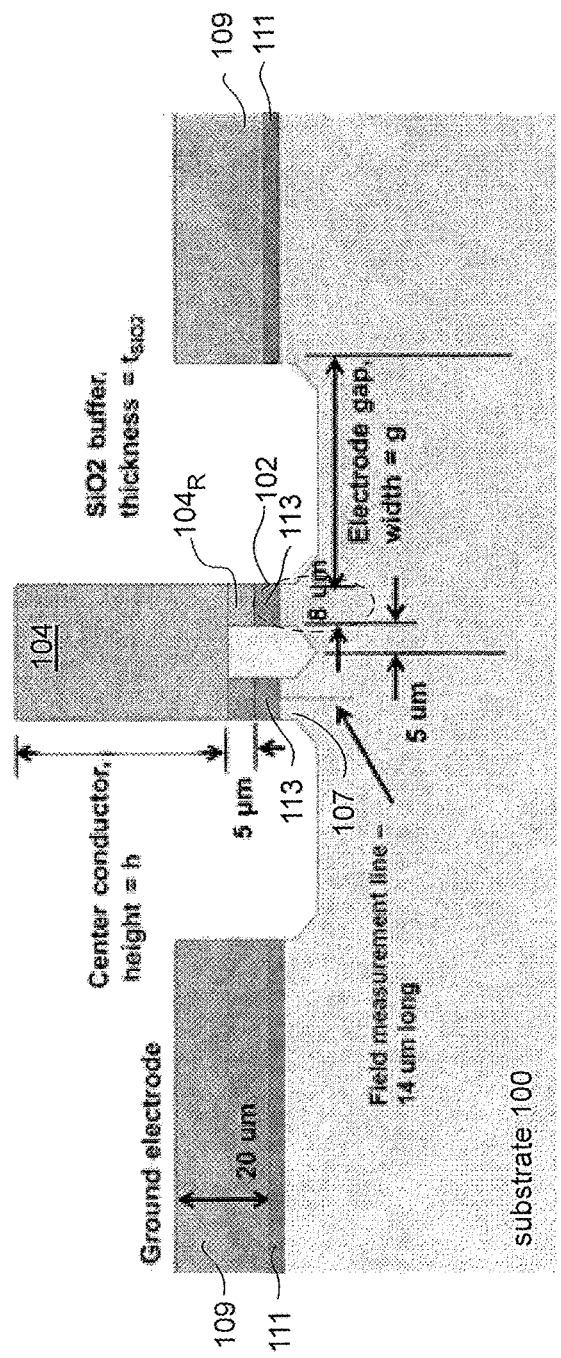
FIG. 12a depicts a simulation model of an electro-optic modulation structure with a coplanar-waveguide transmission-line electrode structure that has a tall center electrode under which both EO waveguides are located and two shorter ground electrodes; 12b illustrates the dependence of the electrode loss at 46 GHz, the characteristic impedance and the RF dielectric constant on the height of the center electrode.
Figure 12B:
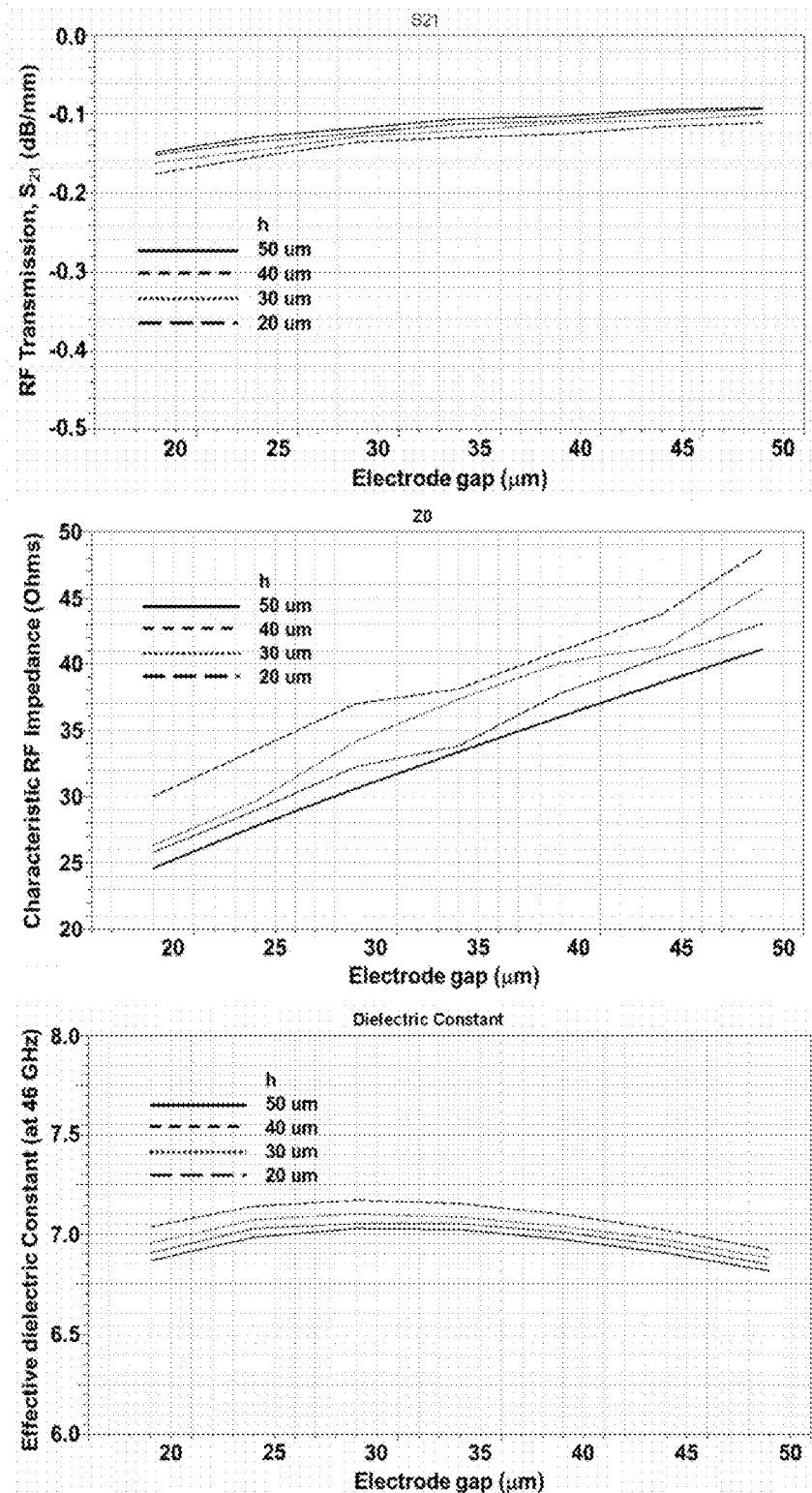
FIG. 12c illustrates the dependence of the characteristic impedance and the RF dielectric constant on the width of the electrode-to-electrode gap and on the oxide thickness.
FIG. 12d illustrates the dependence of the E-field strength at the EO waveguides of this structure and the electrode loss at 46 GHz on the width of the electrode-to-electrode gap and on the oxide thickness
Figure 12C:
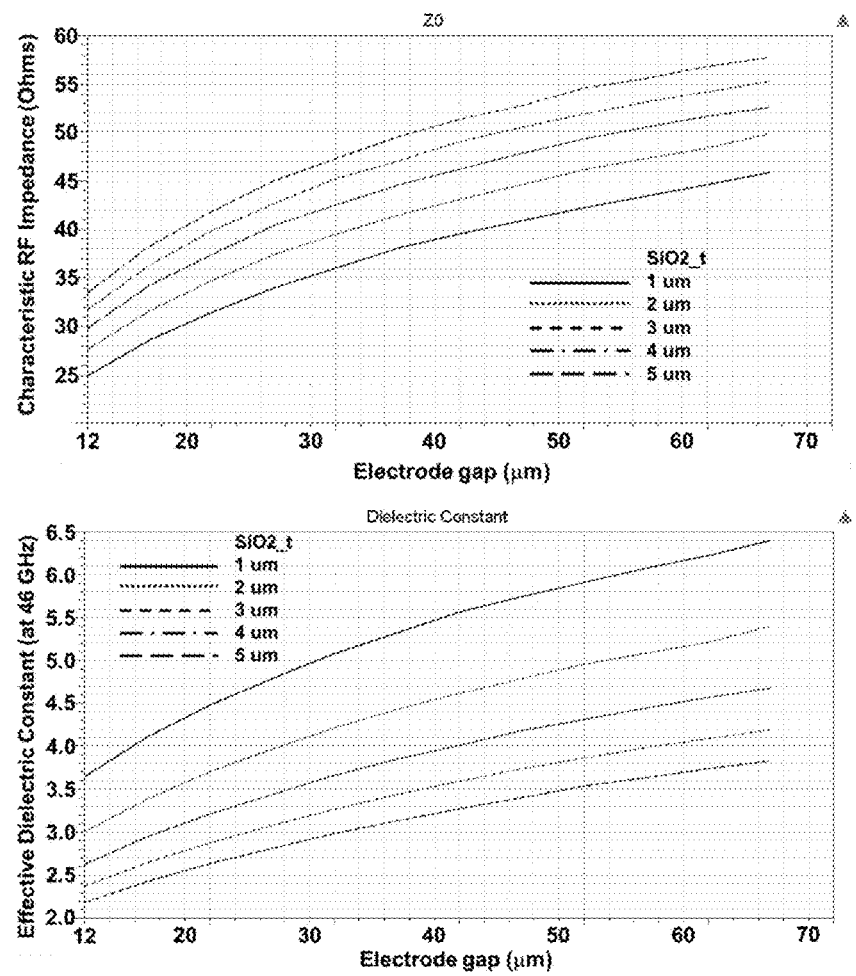
Figure 12D:
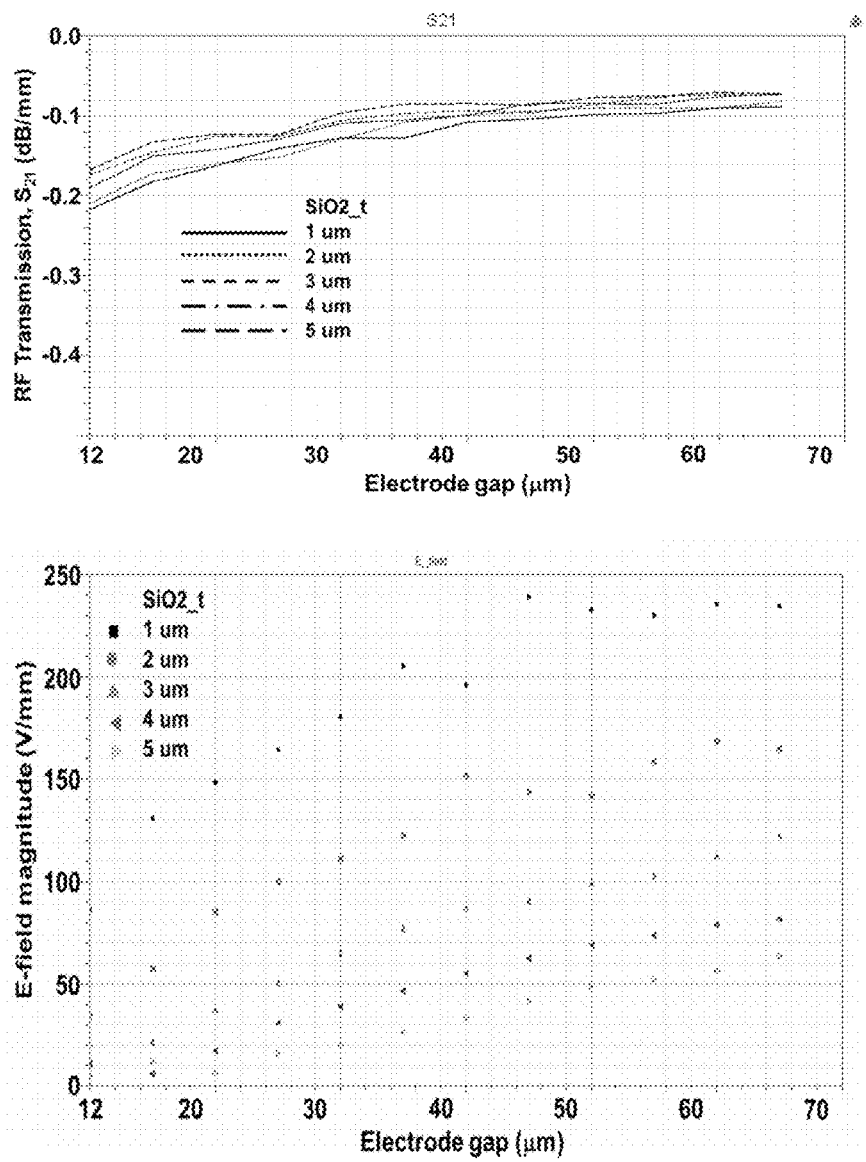

One example of a push-pull modulation structure that has an electrically parallel configuration of its electrodes and its two EO waveguides is illustrated in FIG. 12a. We use this example to illustrate some of the trade-offs involved in the design of a voltage efficient push-pull modulation structure. FIG. 12a does not show a desirable embodiment of the invention, but rather serves to illustrate problems which arise in the design of electro-optic modulators which should help give the reader a greater appreciation for the benefits of the technological advances described herein. The electrode structure in this example is a coplanar-waveguide (CPW) transmission line in which two EO waveguides 102 are located underneath a common center conductor 104. The two EO waveguides 102 have opposite poling and each EO waveguide can be located on a ridge 107 formed on the lithium niobate substrate 100. The center conductor of the structure depicted in FIG. 12a has two protrusions $104_R$ that extend downward toward the EO waveguides, with one electrode protrusion $104_R$ located above each EO waveguide ridge 107, like the prior structures of Moeller and Cole and of Cole, et al. However, unlike the structures of Moeller and Cole and of Cole et al. (or the structure of Noguchi et al.), the height of the metal in the center conductor 104 can be different from and much greater than the height of the metal in the two ground electrodes 109 of the CPW transmission line structure. FIGS. 12b, 12c and 12d show plots of simulation results obtained for exemplary variations of the structure of FIG. 12a. FIG. 12b shows the dependence of the RF transmission, impedance and dielectric constant of the electrode structure on the height of the center conductor and on the width of the two gaps between that center conductor and the two ground conductors. The transmission loss of the RF field propagating in this transmission line can be reduced somewhat by using a taller center electrode. However, for the structure of FIG. 12a, in which only the height of the center conductor is varied, the effect of electrode height on the transmission loss is much weaker compared to the effect of electrode height on the transmission loss of the prior art electrode structure of FIG. 3a, for which the height of all three electrodes in that CPW structure are varied together. The height of the center electrode of FIG. 12a also has a relatively weak effect on the characteristic impedance and the RF dielectric constant of the structure. For example, changing the electrode height from 20 μm to 50 μm changes the impedance by only 5 Ohms (i.e., 10-15%) and changes the effective dielectric constant by approximately 2%. The plots of FIG. 12b show, however, that the characteristic impedance (a value of approximately 50 Ohms is desired) depends strongly on the width of the gap between the center electrode and the ground electrodes.

The simulation results plotted in FIG. 12b are for a structure that has an oxide buffer 111 directly underneath its ground electrodes 109 and an oxide buffer 113 directly underneath each of the protrusions 1048 of its center conductor 104. The simulation results plotted in FIGS. 12c and 12d are for a structure that has a $SiO_2$ oxide buffer 113 underneath only its center conductor, with the metal ground electrodes 109 being directly in contact with the lithium niobate substrate 100. FIG. 12c shows the dependence of the RF impedance and dielectric constant of the electrode structure on the width of the two gaps between that center conductor and the two ground conductors and on the thickness of the oxide layer underneath the center conductor. FIG. 12c indicates that in order to achieve 45 Ohm impedance for this parallel-configured structure (a 10% departure from the desired 50 Ohm impedance), the electrode-to-electrode gap must be nearly 70 μm for oxide thickness of 1 μm or the oxide thickness must be 4 μm for an electrode-to-electrode gap of approximately 30 μm. The RF dielectric constant achieved with the former dimensions is approximately 6.5 and the RF dielectric constant achieved with the later dimensions is approximately 3.2. For comparison, the RF dielectric constant value desired for velocity match to the propagating optical field is 4.6. The match between the velocities for the propagating RF modulation-control field and the propagating light being modulated constrains the maximum modulation frequency and the maximum length of the electrodes for which effective modulation can be obtained. For this structure, it is possible to achieve the desired combination of velocity match and impedance match. For example, an electrode-to-electrode gap of 50 μm and an oxide thickness of 2 μm can simultaneously achieve an RF dielectric constant of 4.8 and a characteristic impedance of 45 Ohms (which is sufficiently close to 50 Ohms for reasonable impedance matching).

FIG. 12d shows the dependence of the RF transmission on the width of the two gaps between that center conductor and the two ground conductors and on the thickness of the oxide layer underneath the center conductor and also the dependence of the RF E-field strength in the EO waveguide on these same parameters. The loss of this electrode structure is reduced (and the transmission is increased) as the gap between the center electrode and the ground electrodes is increased. For gap widths of 40 μm and larger, the loss at 46 GHz is approximately 0.1 dB/mm or lower. The value for E-field strength achieved for the structure of FIG. 12a that has oxide beneath only the center conductor is approximately 150 V/mm for the velocity and impedance matched case with the electrode-to-electrode gap of 50 μm and the oxide thickness of 2 μm. Somewhat higher E-field strength, increased to approximately 170 V/mm, can be achieved by increasing the electrode-to-electrode gap to 60 μm, which also improves the impedance match because the characteristic impedance now becomes 48 Ohms. However, the velocity match is degraded slightly, but remains mismatched by less than 20%, since the value for the RF dielectric constant becomes 5.2. The increase in the E-field strength with larger electrode-to-electrode gap occurs because even more of the E-field lines are directed through the lithium niobate material rather than through the air in the regions between the electrodes. Substantially higher E-field values, approaching 240 V/mm could be achieved for a thinner oxide layer of 1 μm thickness, but both the velocity match and the impedance match would be degraded severely, which drastically limits the maximum allowable modulation frequency.

The overall path for the E-field lines between the center electrode and ground electrode of a CPW structure traverses vertically through the ridges formed in the $LiNbO_3$ substrate and also traverses laterally through the $LiNbO_3$ substrate over the distance of the width of that gap between the electrodes. Thus, the overall path-length for the E-field would be approximately 80 μm for an electrode-to-electrode gap of 60 μm. This long path reduces the E-field strength that is achieved for a given voltage applied between the center electrode and a ground electrode of the CPW structure.

Since it has an electrically parallel arrangement of its two lithium niobate EO waveguides (in contrast to a series arrangement), the structure of FIG. 12a has a high effective capacitance, which lowers the characteristic impedance and increases the effective dielectric constant. In order to reduce the effective capacitance to achieve the desired characteristic impedance and dielectric constant, a thick oxide buffer layer is added between the metal electrodes and the lithium niobate material or there must be a large spacing between the electrodes. This thick oxide buffer or large electrode-to-electrode spacing degrades the voltage efficiency of that structure, as discussed above. A parallel configuration could be preferred, however, when the EO strips comprise materials whose effective dielectric constant or refractive index at microwave and millimeter-wave frequencies is similar in value to its dielectric constant or refractive index at optical frequencies, as discussed below.

Figure 13:
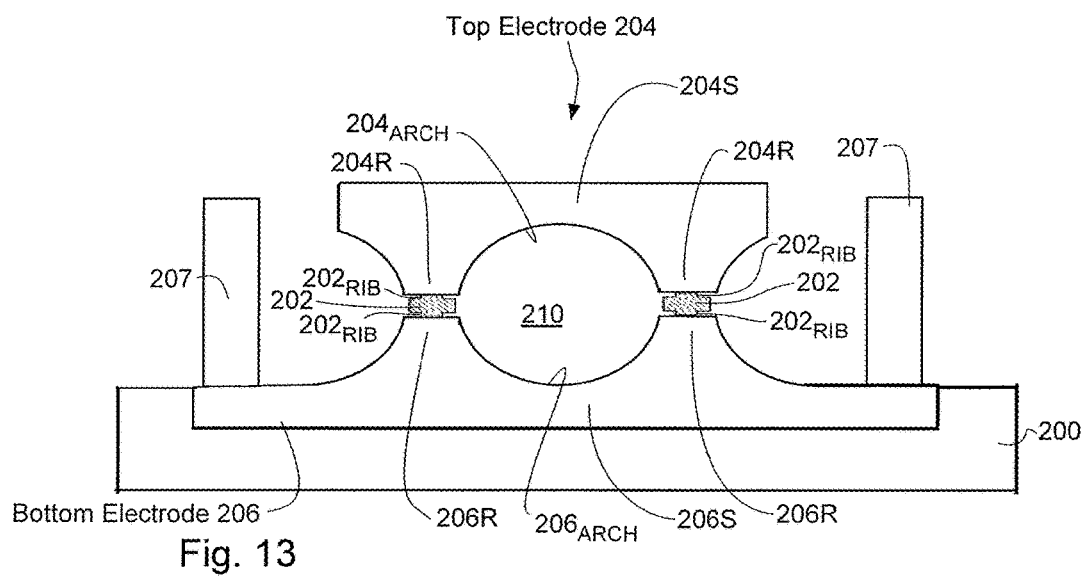
FIG. 13 depicts an embodiment of a parallel configured electro-optic modulation structure with a dual, double-ridge electrode structure.
Figure 14A:
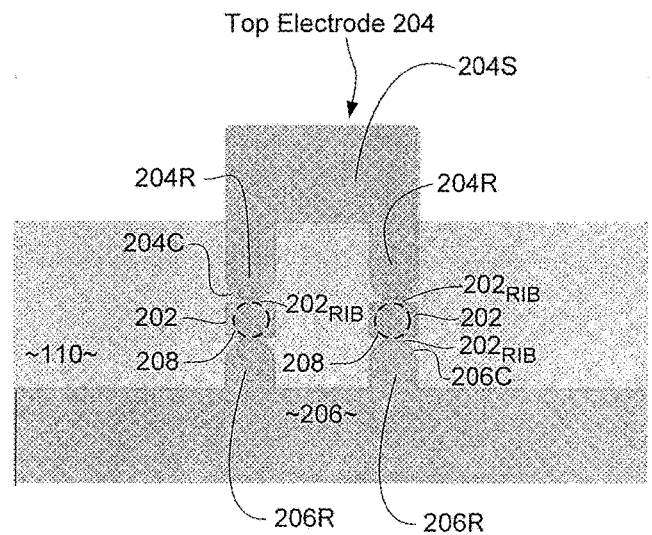
FIG. 14a depicts another embodiment of a parallel configured electro-optic modulation structure with a dual, double-ridge electrode structure.

FIGS. 13 and 14a show cross-section illustrations of embodiments of a push-pull modulator structure. The embodiment shown in FIG. 13 has two optical strips or waveguides 202 that are modulated by a pair of electrodes 204 and 206. An upper or top electrode 204 is located above the two electro-optic (EO) waveguides 202 and a bottom electrode 206 is located below the two EO waveguides 202. Each EO waveguide 202 comprises a strip or ridge of EO material, such as an electro-optic polymer (when the electrodes are electrically coupled in parallel, such as the case in these embodiments, then the electro-optic material used is preferably an electro-optic polymer), that has a rib $202_{RIB}$ provided on its top surface and another rib $202_{RIB}$ provided on its bottom surface. Ribs $202_{RIB}$ are preferably of the same electro-optic material as is the remaining portions of the waveguide or EO strip 202 and moreover ribs $202_{RIB}$ are preferably integral with the rest of each waveguide 202. The EO material in one waveguide or strip 202 is preferably poled in the opposite direction from the EO material in the other waveguide or strip 202. Both EO strips 202 are poled to have their EO dipoles aligned perpendicular to the major surface of substrate 200.

The upper electrode 204 of the modulator of this embodiment has a pair of ridges 204R that extend downward from a slab 204S portion of the electrode 204 and toward the two optical waveguides 202. The ridges 204R taper in width from being relatively wide where they mate with the slab 204S portion of the electrode 204 to being relatively narrow where they contact waveguide 202. The bottom electrode 206 of the modulator has a pair of ridges 206R that extend upward from a slab 206S portion of that electrode and toward the two optical waveguides 202. One ridge 204R of the upper electrode is aligned with an opposing ridge 206R of the lower electrode so that those two ridges 204R, 206R sandwich an optical waveguide formed by EO strip or ridge 202. Similarly, a second ridge 204R of the upper electrode is aligned with a second ridge 206R of the lower electrode so that those two ridges sandwich the other optical waveguide 202. The width of each electrode ridge 204R, 206R is preferably at least as wide as the width of the optical waveguide 202 which it abuts, especially in the vicinity of where they abut. The metal slab regions 204S, 206S between the two ridges of an electrode can have various shapes. The embodiment illustrated in FIG. 13 has a rounded arch-shaped region $204_{ARCH}$ between the two ridges 204R of the top electrode 204 and another rounded arch-shaped region $206_{ARCH}$ between the two ridges 206R of the bottom electrode 206, although other shapes for those regions also could be used. For example, the structure illustrated in FIG. 14a has a square-shaped arch with sharp corners at the underside of the arch. Other than the optical waveguides, the space 210 between the two electrodes preferably is either not filled, is filled with a material such as air or is filled with a material whose dielectric constant is substantially smaller than the dielectric constant of the optical-waveguide material (such as filler 212 shown in the embodiment of FIG. 16a). Examples of such low-dielectric-constant materials are various polymers such as Teflon (PTFE), polyethylene, polypropylene, polyimide and benzo-cyclo-butene (BCB). The bottom electrode 206 can be buried or partially buried in the substrate 200, as shown in FIG. 13, if desired. Alternatively, the bottom electrode 206 can be located above the substrate 200. Exemplary substrate 200 materials include $LiNbO_3$, silicon, gallium arsenide, alumina, silica and glass. FIG. 13 shows the two ridges of each electrode as protruding gradually from the slab portion of that electrode and as having rectangular shape at the ends of those protruding ridges. However, other shapes for those protruding ridges also are possible. For example, the protrusions 204R and 206R from the electrodes 204 and 206 of FIG. 14a have rounded corners and flat tops at their ends where they abut the optical waveguides 202.

Either of the two electrodes 204, 206 could be used as the active electrode and could be electrically connected to the center pin of a coaxial cable (for example) while the other electrode would then typically be used as the ground electrode and could be electrically connected to the shield of a coaxial cable. In the depiction shown in FIGS. 13 and 14a, the bottom electrode 206 preferably extends laterally beyond the width of the top electrode 204. The bottom electrode 206 preferably forms a grounded electrode. The structure may also have optional metal blocks 207 that are attached to the bottom electrode 206 and that extend away from the substrate 200. These blocks 207 provide an electrical connection from the bottom electrode 206 to the top side of the structure. Thus, electrical connections to both electrodes 204 and 206 can be made at the same side of the substrate 200.

Each of the EO strips 202 is preferably fabricated from a dielectric EO material such as an electro-optic polymer. The optical mode of the light guided in each of these optical waveguides is defined by the combination of the lateral sides of the EO strip 202, the top and bottom surfaces of the EO strip 202, and the two ribs $202_{RIB}$ on the top and bottom of the EO strip or ridge 202. The width of a rib $202_{RIB}$ is sufficiently narrow and the rib $202_{RIB}$ is sufficiently shallow that the light to be modulated preferably cannot be guided within a rib $202_{RIB}$ of the EO strip 202. Instead, a rib $202_{RIB}$ functions to move the optical mode away from the top (or bottom) surface of the EO strip 202 and towards the center of the EO strip 202. The presence of the ribs $202_{RIB}$ allows the EO strip 202 to be placed flush against the flat ends of the protrusions 204R, 206R of the electrodes 204, 206.

The EO material in the two EO strips 202 are preferably poled in opposite directions in the embodiments with a common top electrode 204. This allows the same polarity E-field, resulting from the voltage applied between electrodes 204 and 206, to produce opposite changes in the refractive index of the EO material in the two EO strips 202. Therefore, this modulation structure produces push-pull modulation of the two electrode arms when the two EO strips 202 are part of the two phase-modulation arms of a Mach-Zehnder interferometer, for example.

Figure 14C:
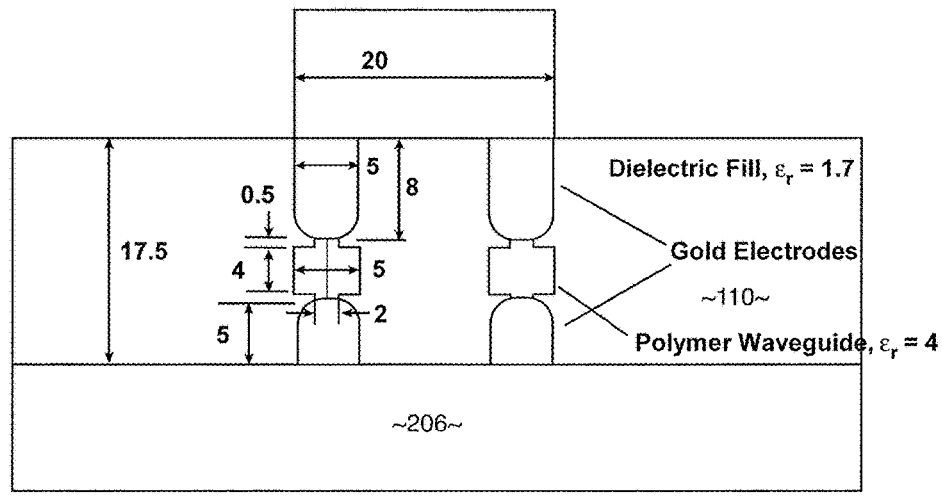
Figure 14C:
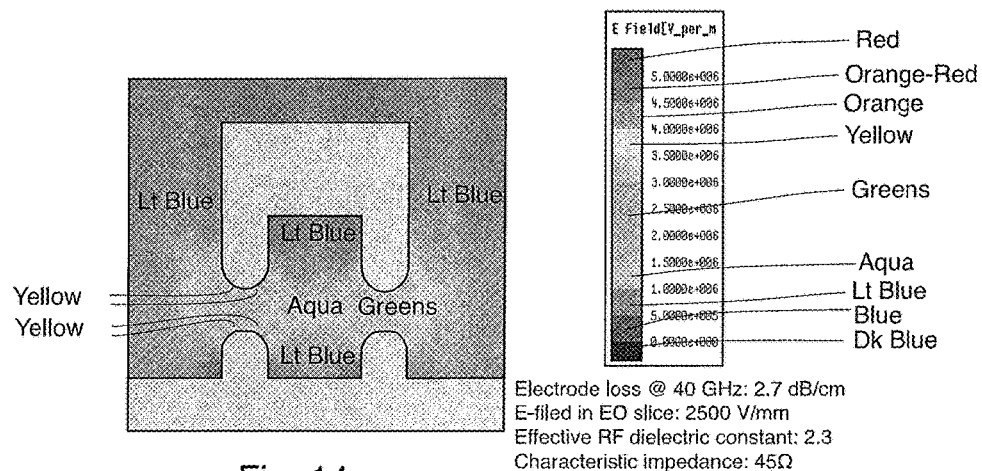

FIG. 14c shows an example of the RF E-field distribution in the modulation structure of FIG. 14a using the dimensions shown for this embodiment in FIG. 14b where the dimensions are given in μm. This simulation was done using HFSS™, a commercially available simulation tool from Ansoft that utilizes a 3-dimensional, full-wave finite element method to compute and visualize the electromagnetic fields. The E-field intensity is highest in the vicinity of the optical waveguides, indicating the effectiveness of the ridged electrode structure for concentrating that applied E-field into the EO material of the modulator. Note that it actually is the D-field (with $D=\varepsilon \varepsilon_o E$, where $\varepsilon$ is the relative permittivity or dielectric constant and $\varepsilon_0$ is the dielectric permittivity of vacuum) that is continuous across interfaces. The E-field is much weaker in the portions of the structure between the two EO waveguide strips and to the outside of those strips. Also, the curved corners of the ridge protrusions $202_{RIB}$ effectively reduce the intensity of the fringing E-fields. The maximum E-field intensity is only approximately a factor of two greater than the intensity of the E-field experienced by the optical mode, indicating the effectiveness of this mitigation of the fringing E-field. As a result, the insertion loss of the RF field propagating in the electrode structure is reduced. Also shown on this figure are values calculated for the RF insertion loss (or electrode loss), the E-field intensity in the EO waveguide strip, the effective dielectric constant experienced by the propagating RF field in the electrode structure, and the characteristic impedance of the electrode structure.

The RF power, P, in the electrode structure is related to the peak-to-peak RF voltage, $V_{pp}$, by the expression $P=0.5$ $(V_{pp}^2/Z_o)$, where $Z_o$ is the characteristic impedance of the electrode structure. The simulation assumed an input RF power level of 1 Watt. For the calculated electrode impedance, the peak-to-peak drive voltage assumed is approximately 9.5 Volts. The calculated E-field intensity at the input end of the electrode structure is 2500 V/mm. The electro-optically induced change in the refractive index of the EO material, $\Delta n$, is proportional to $0.5n^3 r\Delta E$, where n is the refractive index at the optical wavelength (e.g., n=1.6 for an exemplary EO polymer) and r is the electro-optic modulation coefficient of the EO material (e.g., r is approximately $14\times10^{-12}$ m/Volt for an exemplary EO polymer material). An $\Delta E$-field level of 2500 V/mm would change the refractive index of the exemplary EO material by $7.2\times10^{-5}$. The actual E-field strength over the length of the phase-shift arms is lower than the value at the input end of those arms because there is some attenuation of the RF modulation-control field. Assuming an optical wavelength of 1.55 µm, we can estimate the electrode length that would be needed to produce a differential $\pi$ phase shift between light propagated through the two phase-modulation arms of a Mach-Zehnder interferometer with this push-pull modulation structure. Note that the attenuation of a 40 GHz RF modulation signal propagated through the electrode structure is 0.27 dB/mm. The cumulative phase shift of the optical field obtained at the output end of the modulation structure can be estimated by assuming an E-field value that is the average of the values at the input and the output ends of the structure. For a 40 GHz modulation control signal, the average E-field value is approximately 2100 V/mm, assuming an electrode length of 6.4 mm. Assuming this average E-field value, we can verify that the electrode length needed to produce a differential $\pi$ phase shift for the Mach-Zehnder interferometer is approximately 6.4 mm. A figure-of-merit for electro-optic modulators is the $V_\pi L$ product. If the modulation structure of FIG. 14a has EO strips that comprise the exemplary polymer material, the value for $V_\pi L$ would be 6.1 Volt-cm at 40 GHz. This can be compared with the estimated response at 40 GHz of the modulator of Wang et al., for which a value for $V_\pi$ of 16 Volts would be needed for an electrode length of 20 mm ($V_\pi L$=32 Volt-cm) and the same exemplary EO polymer material. The more than factor of 5 lower $V_\pi L$ for the presently disclosed modulation structure compared to this prior modulator is a result of its more efficient use of the modulation-control voltage applied across its top and bottom electrodes. Incidentally, if the EO polymer material (whose optical refractive index is assumed to be 1.6) of the structure of FIG. 14a were to have an electro-optic modulation coefficient that is approximately $50\times10^{-12}$ m/Volt (a value for which some EO polymer materials of reasonable stability have been demonstrated), the corresponding value for $V_\pi L$ would be 2.2 Volt-cm, similar to the value obtained for the example of the embodiment depicted in FIG. 8a.

Figure 15A:
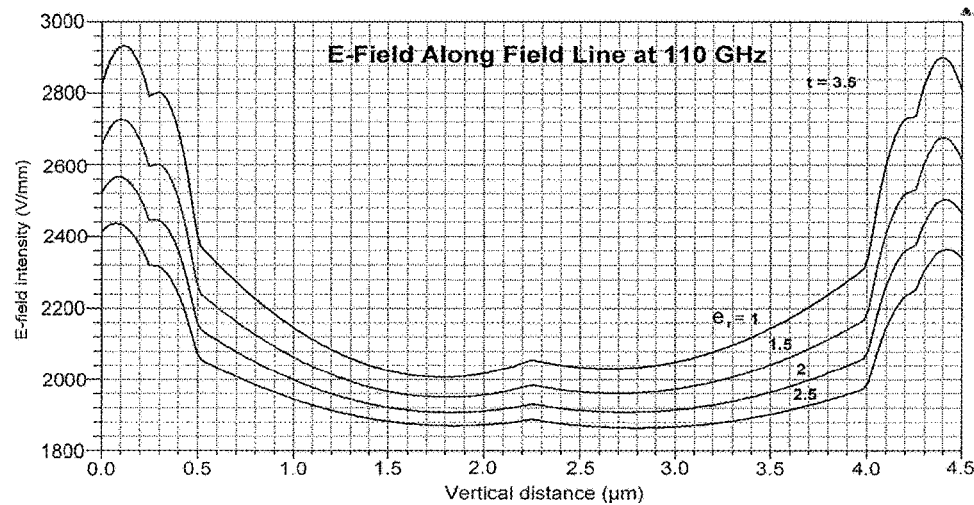
FIGS. 15a and 15b includes graphs depicting the dependence of simulated E-field distribution along the vertical center-line through an EO strip, (FIG. 15a) calculated for various values of the filler dielectric constant L, and (FIG. 15b) calculated for various values of the thickness t of the wider portion of an EO strip (excluding both ribs), with all calculations done for a 110 GHz, 1 Watt input signal.
Figure 15B:
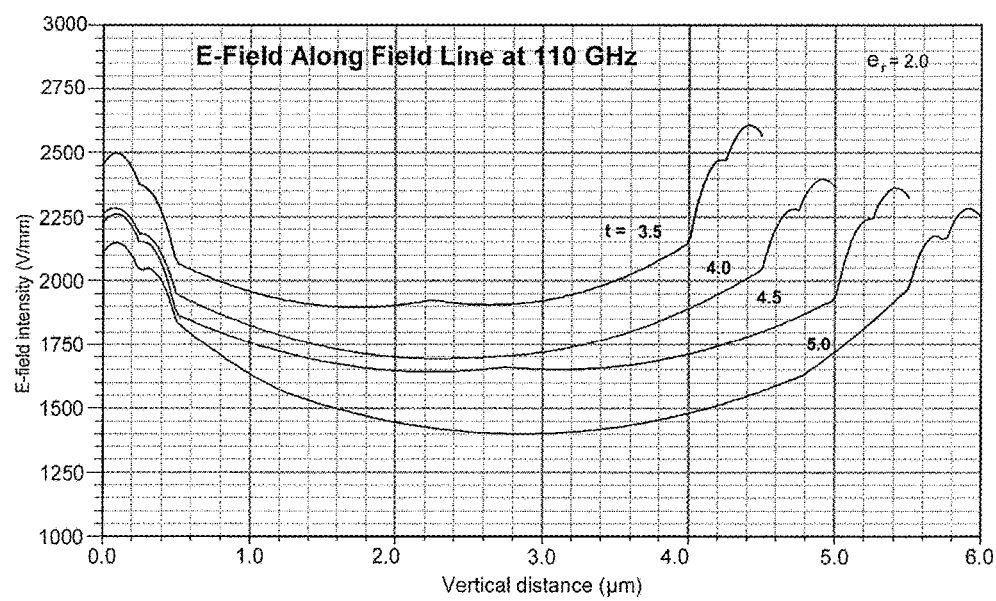

The E-field intensity experienced by the light in the EO waveguide depends on the detailed geometry of the modulation structure. Three parameters that affect the E-field intensity are the dielectric constant of the EO strip, the thickness of that EO strip and the dielectric constant of the filler material in the spaces between the electrode ridges and between the EO strips. FIGS. 15a and 15b show plots of the distribution of the E-field along the vertical axis of an EO strip. Plots are shown for various values of the dielectric constant of the material that fills space 210, and for various values of the thickness of the EO strip 202. The plots indicate that higher E-field is achieved in the EO strip when the filler has a lower dielectric constant and when the EO strip is thinner.

The plot in FIG. 14c of the E-field distribution shows that the E-field intensity is very weak in the vicinity of the horizontal slabs or bases 204S and 206S of the two electrodes 204 and 206 (the metal ridges 204R and 206R protrude from those horizontal slabs or bases 204S and 206S, respectively). Thus, those two slabs do not need to be very tall. It is sufficient to make the height of those slabs significantly greater than the skin depth. For modulation-control signals of frequencies above 10 GHz, a slab height of 5-10 µm should be reasonable for both the upper electrode 204 and the lower electrode 206. Also, a height of 5 µm for the protruding electrode ridges 204R and 206R may be sufficient to achieve negligible E-field intensity in the vicinity of the slabs 204S and 206S, and away from the tips of those ridges 204R and 206R.

Table I summarizes results of electro-magnetic field simulations of the structures of FIGS. 8a, 9a and 12a. The simulations were done using HFSS®, a commercially available finite-element simulation tool from Ansoft. All three of these structures have lithium niobate EO material, to permit a more direct comparison between their characteristics. The structures of FIG. 12a require their two EO strips to have opposite poling whereas the structures of FIGS. 8a and 9a can make use of EO strips that have the same poling in a common direction. The E-field intensity at the optical mode is approximately 4 to 8 times higher for the embodiment of FIGS. 9a and 8a, respectively, than for an E-field maximized version of the structure of FIG. 12a. The characteristic impedance of all three structures can be made fairly close to 50 Ohms. The embodiment of FIG. 8a achieves a much better velocity match between the optical and microwave fields than is achievable by the embodiment of FIG. 9a. The thickness of the driven electrodes of the FIGS. 8a and 9a can be smaller than 10 µm, because the lateral width of these electrodes is not constrained. In comparison, the thickness of the center electrode of FIG. 12a is generally between 20 and 50 µm.

TABLE I

| Characteristic | FIG. 12a (2 µm thick center oxide; 60 µm wide electrode gap) | Embodiment of FIG. 8a | Embodiment of FIG. 9a | Embodiment of FIG. 14a |
|---|---|---|---|---|
| Modulating RF electric field obtained with 1 W RF input power | 150 V/mm | 1200 V/mm | 600 V/mm | 2500 V/mm |
| Characteristic impedance | 45Ω | 45Ω | 46Ω | 45Ω |

TABLE I-continued

| Characteristic | FIG. 12a (2 µm thick center oxide; 60 µm wide electrode gap) | Embodiment of FIG. 8a | Embodiment of FIG. 9a | Embodiment of FIG. 14a |
|---|---|---|---|---|
| Effective RF dielectric constant (value desired for velocity match) | 4.8 (4.6) | 4.4 (4.6) | 6.2 (4.6) | 2.3 (2.5) |
| Electrode loss at 40 GHz | 0.09 dB/mm | 0.30 dB/mm | 0.33 dB/mm | 0.27 dB/mm |

The embodiments of FIGS. 8a and 9a achieve higher E-field intensity at the locations of the guided light even though the voltage applied at their electrodes must be dropped through an electrically series or serial connection of two EO strips or ridges. Such a serial connection would reduce the E-field resulting from an applied voltage by a factor of two. In contrast, the structure of FIG. 12a has an electrically parallel arrangement of its two EO waveguides (permitted because that structure has oppositely poled EO waveguides). Despite the less efficient electrically series or serial arrangement of the embodiments of FIGS. 8a and 9a, those embodiments achieved higher E-field levels and thus more efficient modulation than the structure of FIG. 12a. However, the RF loss is much lower for the structure of FIG. 12a. This lower loss enables the modulation structure of FIG. 12a to be longer; but the increased length does not fully compensate for the lower modulating E-field strength, especially compared to the structure of FIG. 8a.

Table I also includes, for comparison, simulation results for the structure of FIG. 14a. Like the structure of FIG. 12a, the two EO strips in the structure of FIG. 14a have opposite poling and an electrically parallel configuration. The two EO strips in the structure of FIG. 14a, however, preferably comprise EO material such as an EO polymer whose dielectric constant at microwave and optical frequencies are approximately the same, instead of comprising lithium niobate. Thus, very high E-field strength can be achieved with the structure of FIG. 14a by having a small electrode-to-electrode spacing (between ridges 204R and 206R), unlike the structure of FIG. 12a which has a large spacing between electrodes 104 and 109.

The embodiments of FIGS. 13 and 14a have an electrically parallel arrangement of the two EO strips 202 in the electrode structure. Such a parallel configuration is useful for materials like EO polymers whose dielectric constant or refractive index at microwave and millimeter-wave frequencies is comparable in value to its dielectric constant or refractive index at optical frequencies. In some cases, it is desirable to use a material like lithium niobate in the EO strip of a parallel electrical configuration with closely space electrodes like the ones shown in FIGS. 13 and 14a. For such cases, the average RF dielectric constant or refractive index of the EO strip containing the lithium niobate would need to be made much smaller than the RF dielectric constant of the lithium niobate material itself. One way to accomplish this reduction is to place a thin layer of lithium niobate in a sandwich between two layers of a cladding material that has a very low dielectric constant or refractive index at microwave and millimeter-wave frequencies. It is especially desirable for that sandwiching or cladding material to have a dielectric constant or refractive index value at microwave and millimeter-wave frequencies is smaller than its value at optical frequencies.

III. EO Strip Formed as a Sandwich of Lithium Niobate and an EO Polymer

Figure 16B:
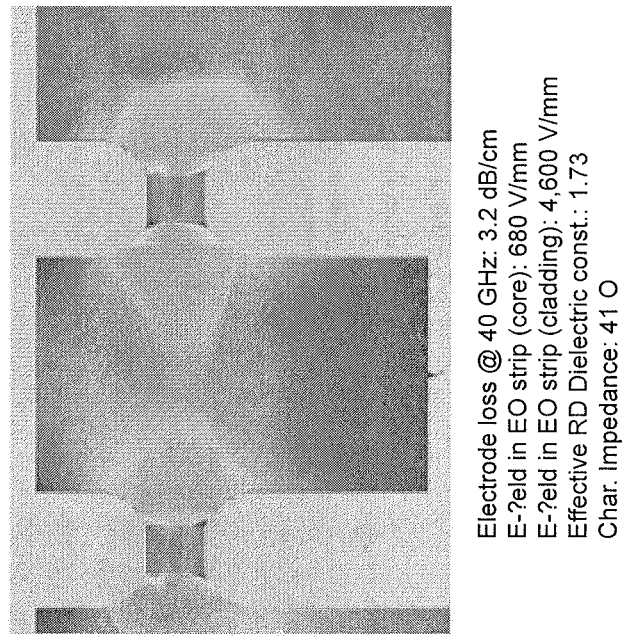
FIG. 16a depicts a simulation model for another embodiment of a parallel configured electro-optic modulation structure; and 16b shows an example of a simulated RF E-field distribution calculated for the structure of FIG. 16a. For the case shown, the ridges of the top electrode and bottom electrode have their sides exposed to air.
Figure 16A:
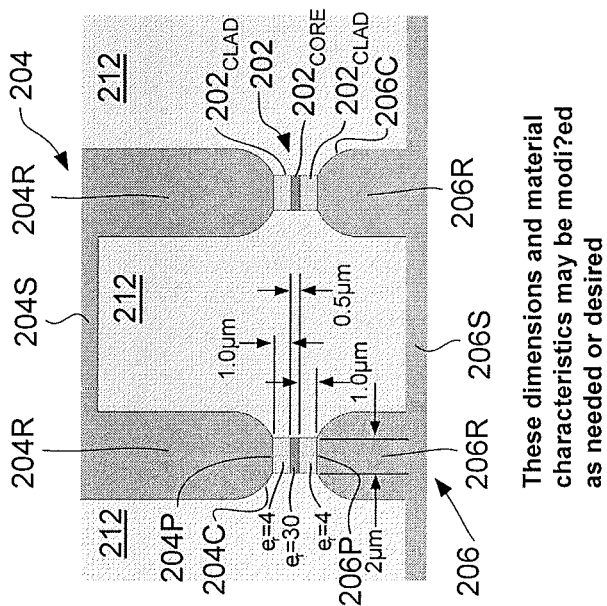

FIGS. 16a and 16b show another embodiment of a push-pull modulation structure. In this embodiment, each optical waveguide 202 comprises a core $202_{CORE}$ of an EO material (which is much thinner (about 0.5 µm) than the EO material in the EO strips of the embodiments of FIG. 13, 14a or 8a (which are preferably about 2 to 5 µm thick) and core $202_{CORE}$ is located between upper and lower cladding layers $202_{CLAD}$, forming an optical waveguide sandwich 202 of these three narrow strips. The core layer $202_{CORE}$ can comprise an EO material such as $LiNbO_3$ which has an electro-optic orientation that can be set or reversed by poling. The cladding layers $202_{CLAD}$ preferably comprise a dielectric material whose optical refractive index is lower than the optical refractive index of the material comprising core layer $202_{CORE}$. Preferred examples of the material comprising cladding layers $202_{CLAD}$ include various electro-optic polymers. If cladding layers $202_{CLAD}$ were to comprise non-electro-optic materials such as silicon dioxide, a low-index silicon nitride (whose refractive index is significantly smaller than the refractive index of lithium niobate), and non-electro-optic polymers such as polyimide and benzo-cyclobutene, that would not be as advantageous as using an EO Polymer for the cladding layers $202_{CLAD}$ as suggested with respect to this embodiment. The width of the optical waveguide sandwich 202 preferably is less than the width of the ridges 204R and 206R protruding from the top and bottom electrodes. Indeed, ridges 204R taper in width at their distal ends (with rounded corners 204C in this embodiment) from being relatively wide (where they mate with the slab 204S portion of the upper electrode) to being relatively narrow where they preferably form a flat portion 204P which contacts waveguide 202. Likewise, ridges 206R taper in width at their distal ends (with rounded corners 206C in this embodiment) from being relatively wide (where they mate with the slab 206S portion of the bottom electrode) to being relatively narrow where they preferably form a flat portion 206P which also contacts waveguide 202. The space 210 between the electrodes can be filled with air or, alternatively, with a dielectric filler material 110 that has a relatively low RF dielectric constant compared to the net dielectric constant of the materials comprising the optical waveguide sandwich 202.

In the embodiment of FIG. 16a (and also the embodiment of FIG. 19a discussed below), the EO strip or ridge 202 is formed as a sandwich 202 of materials $202_{CORE}$ and $202_{CLAD}$. With reference to FIG. 16a, the width of the cladding layers $202_{CLAD}$ in the sandwich EO strip 202 is the same as the width of the core layer $202_{CORE}$ in that sandwich EO strip, the lower-index cladding layers $202_{CLAD}$ are necessary for constraining the waveguided light away from the metal electrode ridges 204R, 206R. Preferably, an EO polymer material is used for the two cladding layers $202_{CLAD}$ of the optical-waveguide-sandwich EO strip 202, instead of a non-electro-optic material such as $SiO_2$.

Figure 19B:
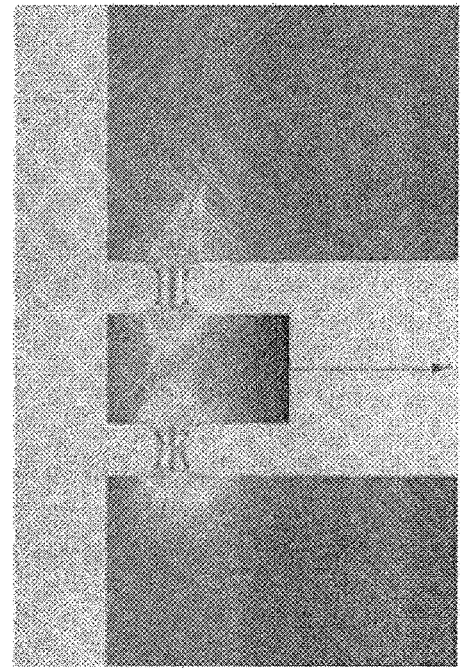
Figure 19A:
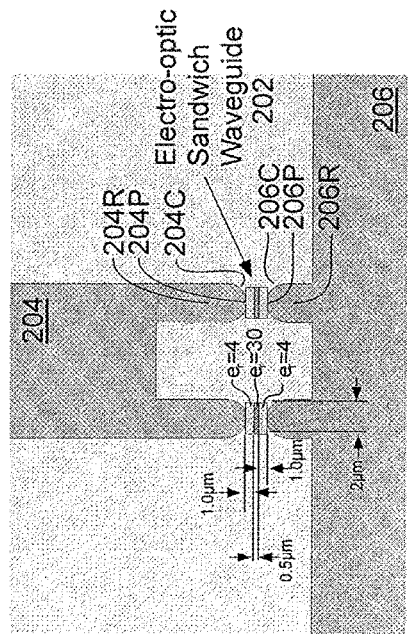
FIG. 19a depicts a simulation model for an embodiment similar to the embodiment depicted by FIG. 16a but for which the width of the EO strip extends beyond the flat tips of the protruding ridges of the top electrode and the bottom electrode.
Figure 20:
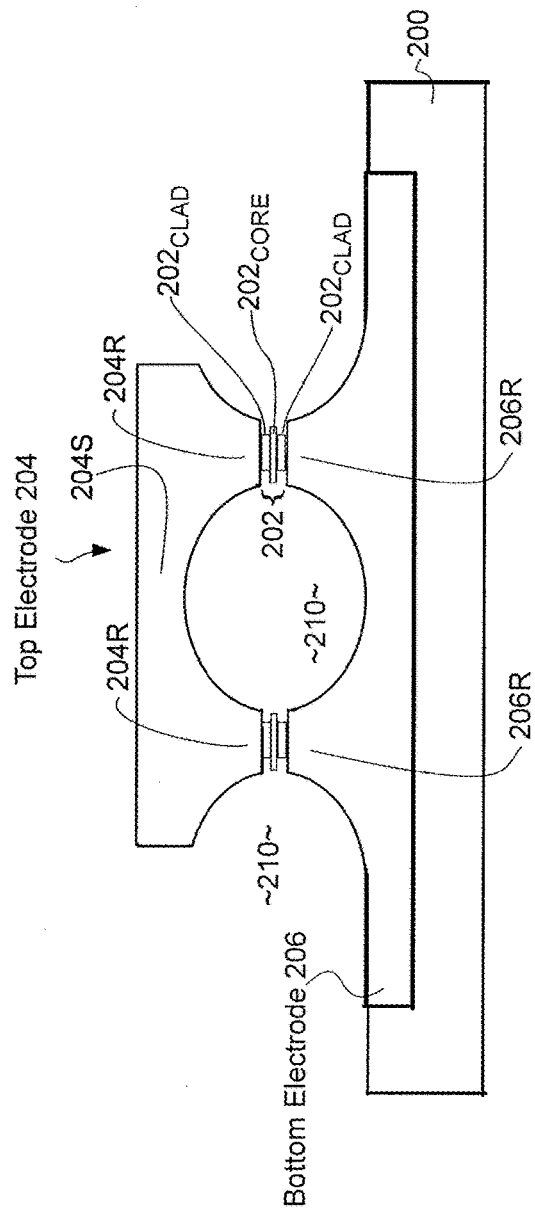
FIG. 20 depicts another embodiment of a parallel configured electro-optic modulation structure with a dual, double-ridge electrode structure.

FIG. 19a illustrates an embodiment in which the width of the optical waveguide strip 202 is made wider than the embodiment of FIG. 16a. In this embodiment each optical waveguide strip 202 extends laterally beyond the flat portion of the tips of the electrode protrusions 204R and 206R. FIGS. 16b and 19b show values calculated for the RF insertion loss (or electrode loss), the E-field intensity in the EO waveguide strip, the effective dielectric constant experienced by the propagating RF field in the electrode structure, and the characteristic impedance of the embodiments of FIGS. 16a and 19a, respectively. Increasing the width of the optical waveguide sandwich 202 does increase the E-field level in the $LiNbO_3$ core $202_{CORE}$ of that strip 202. Increasing the width of the optical waveguide sandwich 202 also increases the effective RF refractive index of the propagating RF field, without having to add a dielectric filler material around the electrode ridges and the optical waveguide strips. As a result, less E-field is in the region between the two electrode ridges of an electrode and also less E-field is in the region between the two EO strips 202. Both of these effects are desirable. However, the embodiment of FIG. 19a with wider sandwich optical waveguide strip 202 has a lower value for its characteristic impedance, which does not match as well to 50 Ohms as does the embodiment of FIG. 16a. Also, the electrode loss is much higher. This higher loss occurs because the intense fringing E-fields in the regions between the corners of the ridges 204R and 206R and the extended portions of the optical waveguide strip 202 occur over a larger area. One way to both achieve the higher E-field level of a wider EO waveguide strip 202 and reduce the intensity of the fringing E-field near the corners of the protruding ridges of the electrodes abutting that strip is to form ribs at the top and bottom of the EO strips 202, as illustrated in the embodiment of FIG. 20. These ribs in the EO strips 202 are like the ribs illustrated in the embodiments of FIGS. 8a, 9a, 13 and 14, the ribs defining mesas (formed by $202_{CLAD}$ in the embodiment of FIG. 20) which contact upper electrodes $104_1$ and $104_2$ (electrode 204 in the embodiment of FIG. 20). Those ribs and their associated mesas may be formed by etching away the outer lateral portions of the cladding layers $202_{CLAD}$ in the optical waveguide sandwiches of the structures illustrated in FIGS. 16a and 19a so that the EO polymer cladding layers $202_{CLAD}$ are each of a lesser width than is the $LiNbO_3$ core $202_{CORE}$. (In an alternative embodiment, such a sandwich EO strip 202 also could be incorporated into the modulation structures of FIGS. 8a-11).

When the EO strip 202 comprises a sandwich of EO polymer/lithium niobate/EO polymer for the cladding/core/cladding, and when both the lithium niobate and EO polymer materials of a given sandwich EO strip 202 are poled to have the same electro-optic orientation, the effective electro-optic modulation coefficient, r, for that sandwich EO strip can be made to have an intermediate value between the characteristics of the lithium niobate $202_{CORE}$ and the characteristics of the EO polymer cladding layers $202_{CLAD}$. Compared to the values for the dielectric constant and refractive index of lithium niobate, the values for the dielectric constant and refractive index of most EO polymer materials are similar to the values for the dielectric constant ($\varepsilon_c=4$) and refractive index ($n_c=1.5$) described in these embodiments. Thus, the simulation results shown in FIGS. 16b and 19b are indicative of the results obtainable with an EO polymer/lithium niobate/EO polymer sandwich EO strip 202. An EO polymer/lithium niobate/EO polymer sandwich EO strip 202 provides a way to make use of the high electro-optic modulation coefficient and relatively high optical refractive index of the lithium niobate material while also achieving velocity match and approximately 50 Ohm characteristic impedance for the double-ridged electrode structure shown in the embodiment of FIG. 16a. As a result, the embodiments of FIGS. 16a and 19a make efficient use of the applied modulation-control voltage since the two EO strips 202 in those structures are electrically arranged in parallel.

The RF dielectric constant of the $LiNbO_3$ core $202_{CORE}$ ($\varepsilon_{LiNbO3}$ is approximately equal to 30) is much higher than the RF dielectric constant of the EO polymer cladding material $202_{CLAD}$ (the simulations of FIGS. 16a and 19a assumed $\varepsilon_c=4$ for the RF dielectric constant of the cladding material $202_{CLAD}$). Thus, much of the applied voltage would be dropped across the cladding layers $202_{CLAD}$ and the E-field in the $LiNbO_3$ core $202_{CORE}$ would consequently be reduced. In the exemplary embodiments of FIG. 16a, the thickness of the $LiNbO_3$ core layer is 0.5 µm, the thickness of the upper cladding layer is 1.0 µm and the thickness of the lower cladding layer is 1.0 µm. Thus, the percentage overlap of the optical field with the lithium niobate core layer is quite small and the modulation efficiency achieved with the cladding/$LiNbO_3$/cladding sandwich is almost the same as the modulation efficiency achieved with an EO strip that comprises just the EO polymer cladding material. The thickness of the lithium niobate core layer in the sandwich is desirously kept quite small (approximately 0.5 µm) because the optical refractive index of lithium niobate (approximately 2.15) is much higher than the optical refractive index of the cladding material (approximately 1.5 or 1.6).

Figure 21B:
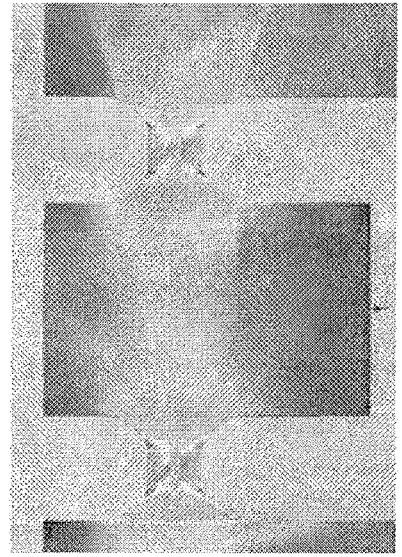
Figure 21A:
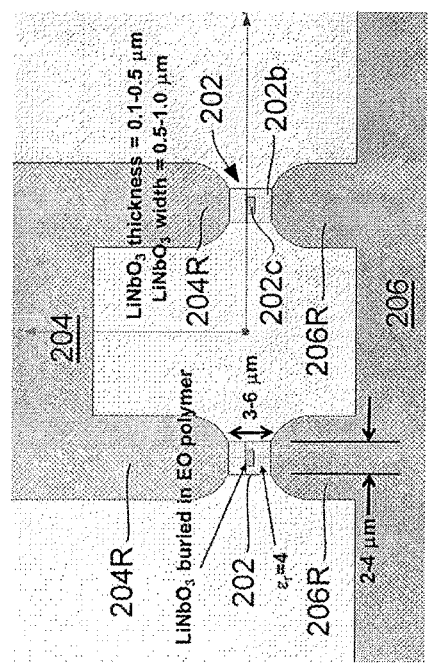
FIG. 21a depicts another embodiment of a parallel configured electro-optic modulation structure with a dual, double-ridge electrode structure
Figure 22:
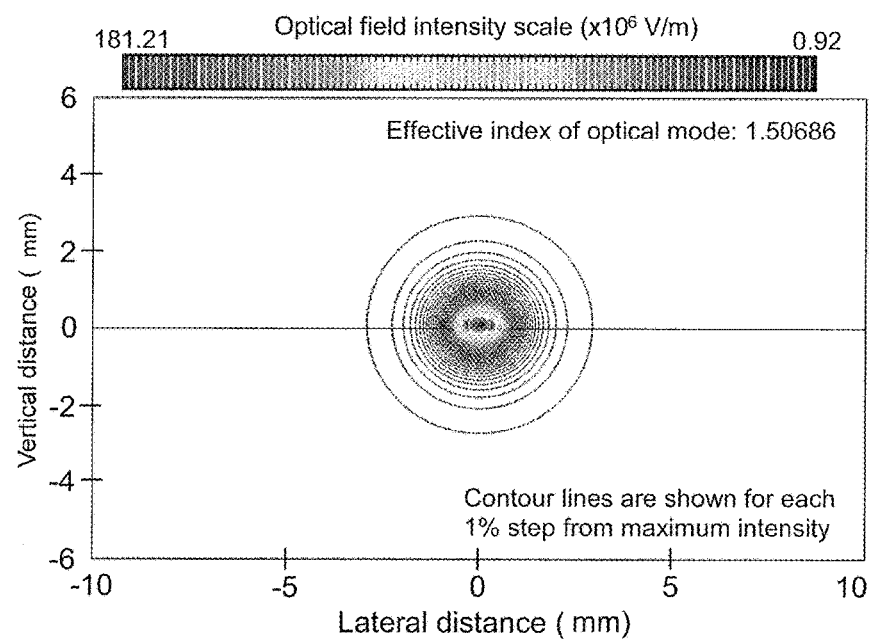
FIG. 22 shows an example of a simulated optical field distribution calculated for an electro-optic waveguide in the structure of FIG. 21a, with the optical-field counter-lines shown for each 1% step in the field amplitude, the highest optical field intensity occurring in the center of the electrode structure and the lowest optical field intensity occurring at the periphery thereof.

FIG. 21a illustrates another modulation structure that has a similar electrode structure (204, 204R, 206, 206R) as that of the embodiments of FIGS. 16a, 19a and 20. However, the EO waveguides 202 of this embodiment preferably comprise a thin and narrow central portion 202c of a high-refractive index material that is buried within a surrounding portion 202b that comprises an EO material such as an EO polymer. If the central portion 202c comprises an EO material such as $LiNbO_3$, the entire EO waveguide 202 may have its refractive index modulated. However, efficient modulation also can be achieved if only the surrounding or burying portion 202b comprises EO material and the central portion 202c comprises a high refractive index non-EO material such as silicon nitride. If the central portion 202c has sufficiently small thickness and width, most of the optical field occupies the electro-optically active material in the burying portion 202b. This is illustrated by FIG. 22, which shows results of an optical-field simulation for a structure whose central portion has a thickness of 0.2 µm, a width of 1.0 µm and a refractive index of 2.15. The refractive index of the burying material is assumed to be 1.5. For the simulation, approximately 90% of the light resides in an elliptical-shaped region that is approximately 2 µm high and 3 µm wide, which is much larger than the high-index central region 202c of FIG. 21a.

The central portion 202c comprises a high refractive index which in the embodiment of FIG. 21a appears wider than it is high. However, the shape of the central portion 202c does not seem to be particularly critical so long as it in embedded within an electro-optical material 202b.

If the central region of the EO waveguide 202 in the structure of FIG. 21a comprises a material such as $LiNbO_3$ whose RF dielectric constant is relatively large compared to the surrounding material, the modulation-controlling E-field is focused toward the center of the EO waveguide and the intensity of the fringing fields is reduced, compared to an EO waveguide that does not have a high-index central region. This effect is illustrated by the plot of the calculated E-field distribution shown in FIG. 21b. Also shown on this figure are values calculated for the RF insertion loss (or electrode loss), the E-field intensity in the EO waveguide strip, the effective dielectric constant experienced by the propagating RF field in the electrode structure, and the characteristic impedance of the electrode structure. Note that the value of the E-field in the EO polymer material for this structure is approximately 4,300 V/mm, and is only slightly lower than the E-field obtained in the EO polymer material of the sandwich structure of the embodiment of FIG. 18a. For the embodiment of FIG. 21a, most of the EO modulation of the waveguided light arises from the EO polymer material $202b$ surrounding the high-index central region $202c$. Thus, even if the central region $202c$ comprises a material such as silicon nitride, whose optical refractive index is similar to that of lithium niobate, but which is not electro-optically active, the net modulation of the waveguided light still would be strong. The high-index central region $202c$ of the EO waveguide (or EO strip) 202 is effective for forming a tightly confined optical waveguide in both the vertical and the lateral directions. The confinement of the light is stronger, and the size of the optical mode is smaller, compared to the embodiments in which that optical confinement is achieved solely by forming ribs (such as ribs $102_{RIB}$ in the embodiment of FIG. 10a or ribs $202_{RIB}$ in the embodiments of FIGS. 13 and 14a, for example) in the EO waveguide 202. Given this strong confinement that is present in the lateral direction, metal electrodes can be located at the lateral edges without causing substantial attenuation of the waveguided light.

IV. Push-Pull Embodiments Applied to a Mach-Zehnder Interferometer Modulator

Figure 17:
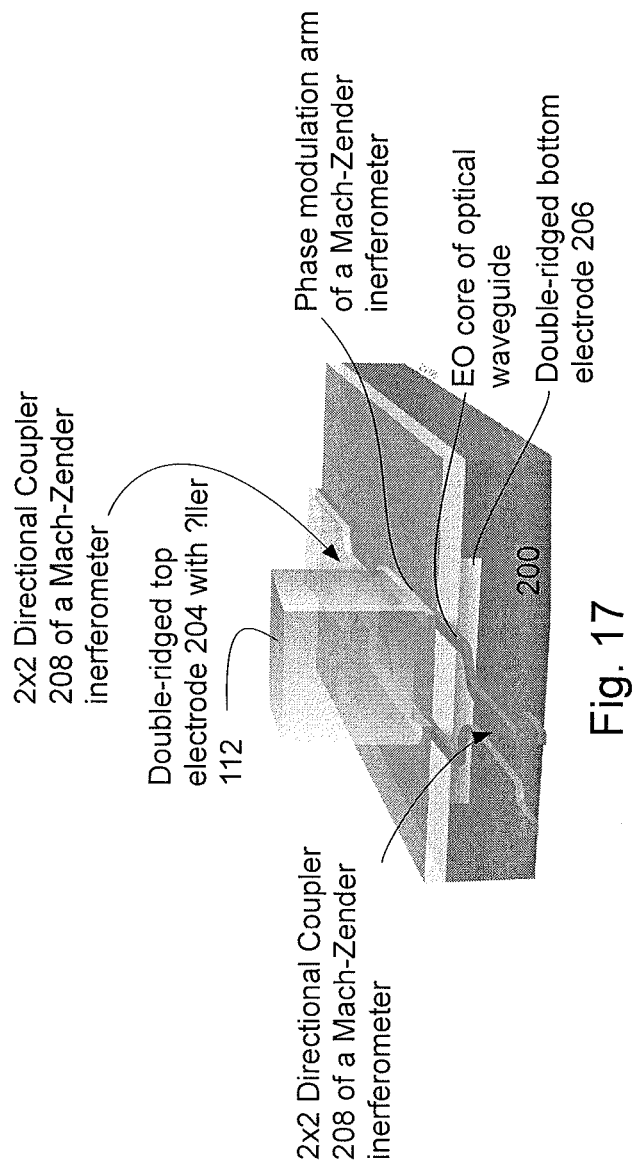
FIG. 17 illustrates the use of the modulation structures shown in FIG. 16a as part of a Mach-Zehnder interferometer (MZI) modulator.

FIG. 17 illustrates how the modulation structures shown in FIGS. 8a, 13, 14a, 16a, 19a, 20 and 21a can be utilized as part of a Mach-Zehnder interferometer (MZI) modulator. FIG. 17 shows the optical waveguide structure of FIG. 16a, as an example. The two optical waveguides 202 of the modulation structure of FIG. 16a, for example, form the two phase-modulation arms of the interferometer. A single RF modulation signal can be applied to the two electrodes of this modulation structure. The MZI modulator illustrated in FIG. 17 has 2×2 directional couplers 208 at each end of the phase-modulation arms (formed by the two optical waveguides 202 of the modulation structure of FIG. 16a, for example). This MZI modulator thus has two optical input ports and two optical output ports. This MZI modulator also can have an electrical input port with two electrical terminals, one terminal being connected to the top electrode 204 and the other terminal being connected to the bottom electrode 206, preferably near the optical input end of the modulator. There generally also is an electrical output port with two electrical terminals, one terminal being connected to the top electrode 204 and the other terminal being connected to the bottom electrode 206, preferably near the optical output end of the modulator. Thus, the electrode structure resembles a parallel-plate RF waveguide with ridges (see ridges 204R and 206R of the embodiment of FIG. 16a, for example) which protrude from both of those plates. The electrode structure also resembles a two-wire RF transmission line with ridges 204R and 206R protruding from both wires. For a MZI modulator that has the modulation structure illustrated in FIG. 8a, for example, then the two top electrodes $104_1$ and $104_2$ could be connected near an input end of the modulator to two electrical terminals of an input port. Also, those two top electrodes $104_1$ and $104_2$ could be connected near an output end of the modulator to two electrical terminals of an output port. The electrode structure for this embodiment of a MZI modulator resembles a two-wire RF transmission line with ridges 104R of electrodes $104_1$ and $104_2$ protruding from both wires. Some of the dielectric filler material 212 between the two electrodes also is shown in the cut-away view depicted in FIG. 17. Note that the filler 212 can be removed from some areas above the bottom electrode 206 or metal blocks 207 can be formed and attached to the bottom electrode to facilitate making a top-side electrical connection to the bottom electrode 206 (as depicted in FIGS. 13 and 14b).

The top electrode 204 of this structure could be fabricated in two steps. In a first step, the two metal ridges 204R could be fabricated after the bottom electrode 206 with its two ridges 206R and the EO waveguides 202 are formed. Having two separate top electrode portions as an intermediate fabrication step allows a DC voltage to be applied between the two metal ridges 204R to pole the two EO waveguides 202. This DC voltage produces oppositely directed E-fields in the two EO waveguides 202, with the electrode 206 acting as an intermediate floating electrode. Alternatively, a DC voltage of a first polarity could be applied between a first metal ridge 204R and the bottom electrode 206 to pole the EO strip 202 that is between those electrodes. Then a DC voltage of a second polarity, opposite from the first polarity, could be applied between the other metal ridge 204R and the bottom electrode 206 to pole the EO strip 202 that is between those electrodes. After the poling process is completed, the slab portion 204S of the top electrode 204, which bridges and interconnects the two metal ridges 204R, can be fabricated.

For the electrode structure of the embodiment of FIG. 8a, the top electrodes $104_1$ and $104_2$ could be fabricated in the processing same steps but those electrodes would not be joined together. The slab portions 104S of those two electrodes $104_1$ and $104_2$ are separate from each other. The bottom electrode 106 of this electrode structure could be formed in the same way as the bottom electrode 206 of the structures depicted in FIGS. 13, 14a, 16a, 19a, 20 and 21a.

V. Protruding Electrode Ridges Preferably have Rounded or Bevelled Corners

Figures 18A, 18B:
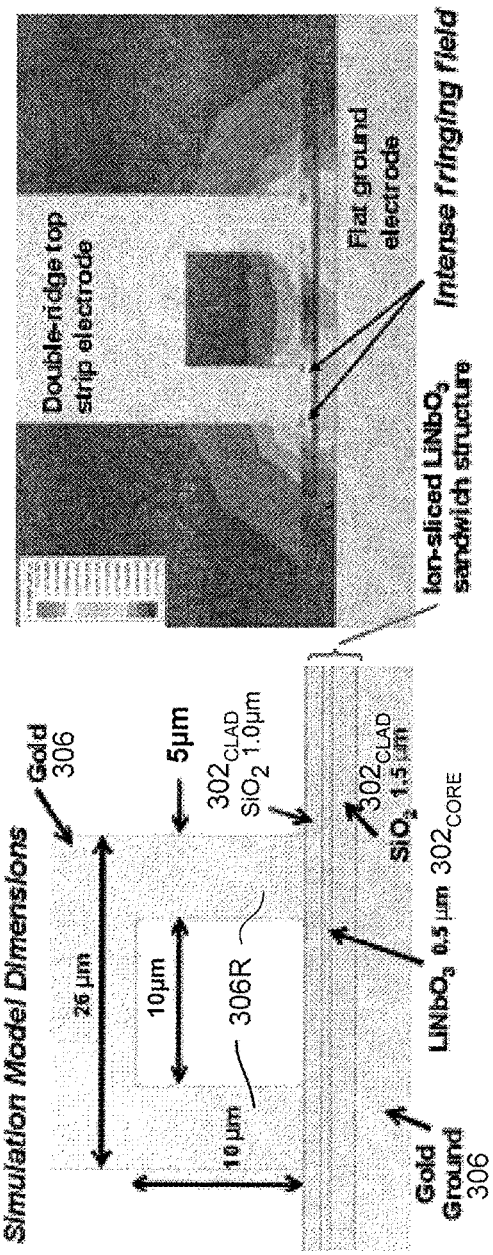

The protruding ridges of the electrodes shown in the embodiments of FIGS. 8a, 9a, 14a, 16a, 19a, and 21a have rounded corners 104C, 106C, 204C, 206C. Also, those ridges 104R, 106R, 204R, 206R are wider than the width of the EO waveguides 102, 202 where those ridges contact the EO waveguides. The protruding ridges 104R, 106R, 204R, 206R of the electrodes shown in FIGS. 10a, 13 and 20 likewise are wider than the width of the EO waveguides 102, 202 at the areas where those ridges contact those EO waveguides. This recessing of side edges the EO waveguides 202 inwardly with respect to the corners of the ridges and this shaping of the corners of the ridges are beneficial for reducing the intensity of the fringing E-fields. To illustrate the effect of the rounded corners and also to highlight the effect of the protruding ridges of the electrodes, the embodiments of FIGS. 8a, 13, 14a, 16a, 19a, 20 and 21a are compared with a structure depicted by FIG. 18a. FIG. 18a depicts a structure in which the bottom electrode 306 does not have any protruding ridges. Also, the ridges 304R of the top electrode 304 have a width that is smaller than the width of the EO waveguide material under those ridges. FIG. 18a shows a structure with an optical waveguide 302 that comprises a laterally extended core layer $302_{CORE}$ sandwiched between two laterally extended cladding layers $302_{CLAD}$. In the exemplary modulation structure of FIG. 18a, the optical waveguide 302 comprises a SiO$_2$/LiNbO$_3$/SiO$_2$ sandwich structure that presents a wide dielectric slab that extends laterally far beyond the width of each of the ridges 304R of the upper electrode 304. There would be two shallow ribs (not shown in the figure) formed in the LiNbO$_3$ waveguide-core layer $302_{CORE}$ of this particular sandwich structure, similar to the ribs of the Rabiei and Steier structure depicted in FIG. 2, with those two ribs being located and aligned directly beneath the centers of the two protruding ridges 304R of the top electrode 304. The light to be modulated would be aligned to the shallow ribs and located directly underneath the two protruding ridges of the upper electrode, and the intensity of the guided light would be strongest under the center of those ridges, as defined by the rib formed in the LiNbO$_3$ layer, and be much weaker near the corners of those ridges. FIG. 18a shows the dimensions of the HFSS simulation model. FIG. 18b shows the E-field distribution that was calculated for a 100 GHz input into this structure. It is evident from the plotted E-field distribution that the protruding ridges of the upper electrode concentrate the E-field into the optical waveguide regions underneath those electrode ridges, as desired. However, the undesired fringing field is very strong at the sharp bottom corners of the ridges 306R.

The E-field distribution plotted in FIG. 18b also shows that a substantial amount of the applied E-field is located beyond the lateral sides of the top electrode and those E-field lines go between the outer sidewalls of the top electrode and the wide upper surface of the slab bottom electrode. Also, a substantial amount of the applied E-field is located in the fairly wide region that is located between the two protruding ridges of the top electrode. Since the waveguide light is located only underneath the electrode ridges, the E-field in the other regions is not useful for modulating the light.

To better concentrate the modulating E-field into the optical waveguides, the presently disclosed modulation embodiments of FIGS. 8, 13, 14a, 16a, 19a, 20 and 21a have ridges in both the top electrode and the bottom electrode, unlike the electrode structure of the prior-art modulators. These figures show the protruding ridges 104R or 204R in the top electrode 104 or 204 and protruding ridges 106R or 206R in the bottom electrode 106 or 206. Also, unlike the structure of FIG. 18a, the optical waveguides preferably comprise two distinct strips 102 or 202, which are located only between protruding ridge 104R or 204R of a top electrode 104 or 204 and the protruding ridge 106R or 206R of a bottom electrode 106 or 206, rather than consisting of a wide slab whose optical channel-waveguiding regions are defined by shallow ribs. As an example, the width of the optical waveguide strip 202 depicted in FIG. 16a may be 2 µm and the width of the electrode ridge 204R, 206R may be 5 µm. The thickness of the optical waveguide strip 202 in embodiments of the present invention can have values between 2.0 µm and 5.0 µm. FIGS. 8c, 14b, 16b, 19b and 21b show the E-field intensity distribution calculated for an input of 40 GHz or 110 GHz. These plots show that the modulating E-field is concentrated or focused fairly well into the regions near the two optical waveguide strips 102 or 202 while concurrently minimizing the fringing E-fields.

The RF dielectric constant ($\varepsilon_c$=4) of the material assumed for the cladding layers in the embodiments of FIGS. 16a, 19a and 21a, although lower than the RF dielectric constant of lithium niobate, still is significantly higher than the dielectric constant of air ($\varepsilon_{air}$=1). Thus, as expected, the E-field intensity in the air regions adjacent to the edges of the EO strip is higher than the E-field intensity in the cladding regions of the EO strip. But the curved corners 204C of the upper electrode and the curved corners 206C of the lower electrode each help to effectively reduce fringing E-field intensity. FIGS. 16b and 19b show that with the ridged electrode structure of the disclosed modulator, most of the RF E-field is focused through the two optical waveguide sandwiches 202.

VIII. Laterally Disposed Electrodes

Figure 23:
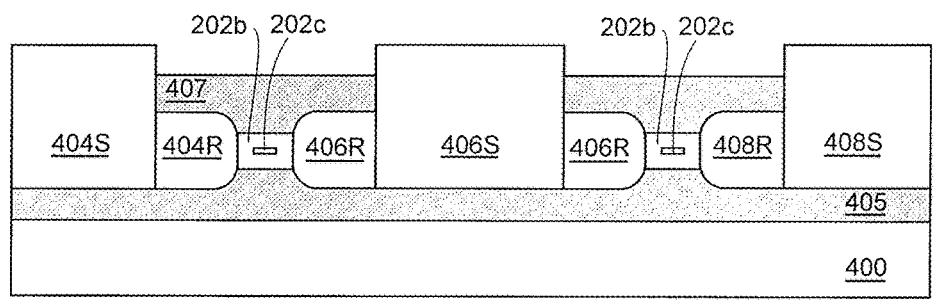
FIG. 23 depicts an embodiment an electro-optic modulation structure that has a lateral ridge electrode structure.
Figure 24:
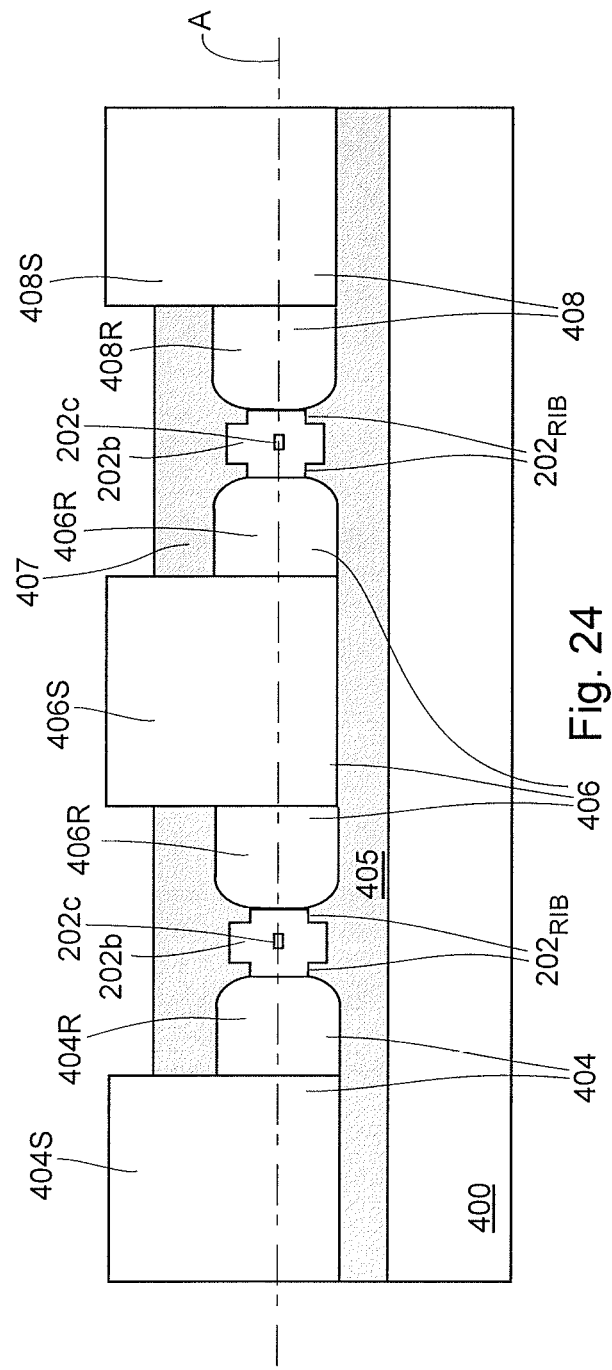
FIG. 24 depicts another embodiment an electro-optic modulation structure that has a lateral ridge electrode structure.

FIGS. 23 and 24 show two illustrative embodiments of modulation structures that have side-placed, elongate electrodes 404, 406 and 408 which are preferably disposed on a common centerline A. These electrodes have protruding ridges 404R, 406R and 408R that extend away from a slab portion 404S, 406S and 408S and toward an EO strip 202 and that contact the EO strip 202. The EO strip or EO waveguide 202 preferably has a high-index central region 202c and a burying region 202b that comprises an EO material such as EO polymer as in the embodiment of FIG. 21a. The central region 202c can comprise an EO material such as lithium niobate or a non-EO material such as silicon nitride. The EO strips 202 in the embodiment of FIG. 24 also have ribs $202_{RIB}$ formed on the two lateral sides of the EO strips 202 that define mesas which make contact with the protruding ridges 404R, 406R and 408R. The outer surfaces the mesas defined by these ribs $202_{RIB}$ contact the protruding ridges 404R, 406R and 408R of the electrodes 404, 406 and 408. These ribs $202_{RIB}$ act to further confine the waveguided light away from the metal electrodes 404, 406 and 408. This embodiment also preferably has a base layer 405 comprising a dielectric material whose RF dielectric constant preferably is substantially smaller than the RF dielectric constant of the EO material in the EO strips 202. The structure also can have and optional cover layer 407 what likewise comprises a dielectric material whose RF dielectric constant preferably is substantially smaller than the RF dielectric constant of the EO material in the EO strips 202. The comparatively lower dielectric constant of the material comprising base layer 405 and cover layer 407 ensures that most of the E-field lines between the electrodes pass through the EO strips 202 instead of bypassing those EO strips. The structure also could include a substrate 400 upon which the other portions of the structure are located.

The combination of electrodes 404, 406 and 408 provide an effective means to pole the EO polymer material of EO strips or waveguides 202. A poling voltage can be applied across electrodes 404 and 406 to pole the EO strip located at the left of the structure of FIG. 23 or FIG. 24. Similarly, a poling voltage can be applied across electrodes 408 and 406 to pole the EO strip located at the right of the structure of FIG. 23 or FIG. 24.

There can be several ways to achieve a push-pull modulation structure with the embodiments of FIGS. 23 and/or 24. For example, the EO material in both EO strips could be poled such that their dipoles are oriented in the same direction (for example, pointing toward the right of these figures). Electrode 406 could then be configured as the center conductor of a coplanar transmission line and electrodes 404 and 408 could be configured as the two ground conductors of that coplanar transmission line. Such a configuration would represent an electrically parallel arrangement of the two EO strips. Alternatively, the EO material in both EO strips could be poled such that their dipoles are oriented in opposite directions (e.g., pointing toward the center of FIGS. 23 and/or 24). A modulation control voltage could then be applied across electrodes 404 and 408, which would function as the two actively driven electrodes of this configuration. Electrode 406 would not be driven with a modulating signal, but would function as a floating, grounded or biased electrode that provides a high electrical-conductivity path to partially shunt the two driven electrodes 404 and 408. Such a configuration would represent an electrically series arrangement of the two EO strips.

Figure 25:
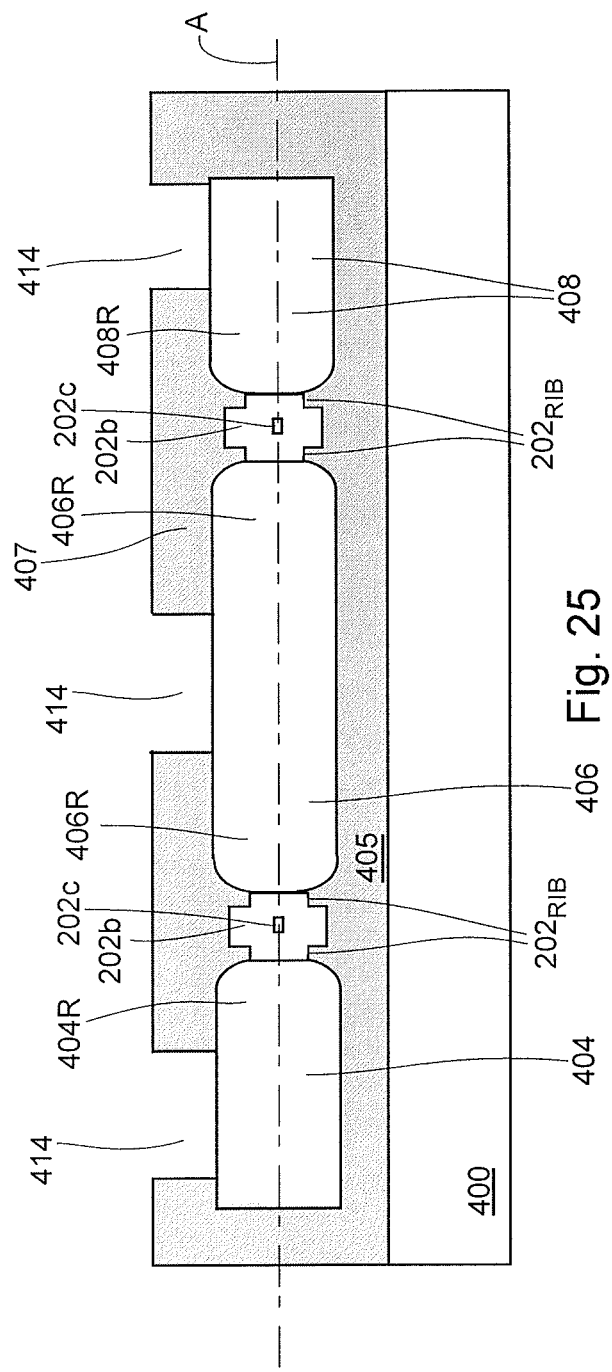
FIG. 25 depicts another embodiment an electro-optic modulation structure that has a lateral ridge electrode structure but wherein the electrodes have no slab portions.

In the embodiments discussed so far reference has been made to slabs of metallic material associated with each electrode. The reason why these prior embodiments have been described as having slabs is that the existence of a slab, such as slabs 404S, 406S and 408S shown in FIG. 24 for example, provide a convenient place to wire bond a conductor to the slab associated with an electrode of the disclosed embodiments. But these devices can be made without such slabs if desired. Consider, for example, the embodiment of FIG. 25 which is very similar to the embodiment of FIG. 24, but slabs 404S, 406S and 408S are missing from this embodiment and instead openings 414 are provided in layer 407 to allow access to electrodes 404, 406 and 408 for bonding external wiring thereto. So the use of bonding slabs such as slabs 104S, 204S and 204S found in other embodiments is a convenient feature in terms of making and using these devices, but they are not essential in that wiring connections can be made without the use of such slabs is desired.

Although lithium niobate has been indicated as an exemplary EO material in the EO strips or ridges of the embodiments depicted in FIGS. 8a-11 and FIGS. 16a, 19a and 21a, other EO materials such as strontium barium nitride (SBN) and other ferroelectric EO materials such as lithium tantalate also could be used. For the embodiments of FIGS. 13, 14a, 16a, 19a, 20 and 21a with EO polymer materials or sandwiches of EO polymer-lithium niobate-EO polymer, the lithium niobate may comprise a doped region. The dopant may be titanium. Although the preferred embodiments show the EO material of the EO strips or ridges as being in direct contact with portions of the metal electrodes, that EO material could be separated from the metal electrode portions by thin layers (e.g., preferably <0.2 µm thickness) of a non-electro-optically active material, such as SiO$_2$, silicon nitride or a non-EO polymer, without departing substantially from the benefits of these embodiments. The various shapes and dimensions and features of the electrodes, their protruding ridges, the EO strips and ridges and their ribs, and the dielectric filler material between two protruding ridges that are described in the embodiments above are provided as examples. Many other combinations of those shapes and features would become evident to one skilled in the art based on the discussions provided above.

While certain embodiments of the present invention have been disclosed for illustrative purposes, they are for specifically explaining the present invention of an Electro-Optic Modulator structure and a method of producing electro-optic modulation of light. As such, the invention according to the present disclosure is not limited thereto and those skilled in the art will appreciate that various modifications, additions and substitutions are possible, without departing from the scope and spirit of the invention as disclosed in the accompanying claims. Accordingly, any and all modifications, variations or equivalent arrangements should be considered to be within the scope of the invention and the detailed scope of the invention as disclosed by the accompanying claims.

What is claimed is:

1. A method of increasing the sensitivity of an electro optic modulator by:

disposing metallic electrodes in direct contact with a slab of electro optical material which, in use, supports an optic mode; and shaping at least one of the metallic electrodes and said slab of electro optical material to urge the optical mode therein away from said metallic electrodes.

2. The method of claim 1 wherein the optical mode is urged away from said metallic electrodes without the use of cladding material between said slab of electro optical material and said metallic electrodes.

3. A Mach-Zehnder interferometer optical modulator comprising:

a pair optical waveguides, wherein a first optical waveguide includes a first strip of dielectric electro-optic material and a second optical waveguide includes a second strip of dielectric electro-optic material;

a first metal electrode portion in direct contact with dielectric electro-optic material of the first strip of electro-optic material;

a second metal electrode portion in direct contact with electro-optic material of the second strip of electro-optic material;

a third metal electrode portion in direct contact with electro-optic material of both the first strip and the second strip of electro-optic material; and a fourth metal electrode portion in contact with the first metal electrode portion and also in contact with the second metal electrode portion;

wherein the first and second strips of dielectric electro-optic material are physically separated from each other when those first and second strips are in direct contact with the first, second and third metal electrode portions.

4. The Mach-Zehnder interferometer optical modulator of claim 3, wherein the fourth metal electrode portion and the third metal electrode portion are configured to have a modulation control voltage applied across them.

5. The Mach-Zehnder interferometer optical modulator of claim 3, wherein the first metal electrode portion and the second metal electrode portion are configured to have a modulation control voltage applied across them.

6. The Mach-Zehnder interferometer optical modulator of claim 3, wherein the third metal electrode portion is a floating electrode.

7. A method of increasing the sensitivity of an electro optic modulator by:

disposing metallic electrodes in direct contact with a piece of electro optical material which, in use, supports an optic mode; and shaping at least one of the metallic electrodes to urge the optical mode in the piece of electro optical material away from the at least one of the metallic electrodes.

8. The method of claim 7 wherein the optical mode is urged away from said at least one of the metallic electrodes without the use of cladding material between said piece of electro optical material and said at least one of the metallic electrodes.

9. The method of claim 7 further including shaping the other one of the metallic electrodes to urge the optical mode in the piece of electro optical material away from the other one of the metallic electrodes.

10. The method of claim 9 wherein the optical mode is urged away from both metallic electrodes by reducing a cross sectional area of each of the metallic electrodes next to or in the vicinity of the piece of electro optical material.

11. The method of claim 10 wherein the optical mode is urged away from both metallic electrodes by reducing a cross sectional area of the piece of electro optical material next to or in the vicinity of each of the metallic electrodes.

12. The method of claim 7 wherein a cross sectional area of the at least one of the metallic electrodes reduces in size continuously from a point near the piece of electro optical material until a point of contact with the piece of electro optical material.

13. The method of claim 7 wherein a cross sectional area of the at least one of the metallic electrodes reduces in size as a step change from a relatively greater cross sectional area to a relatively lesser cross sectional area at a point near, but not in contact with, the slab of electro optical material.

14. A method of increasing the sensitivity of an electro optic modulator by:
disposing metallic electrodes on opposing sides a piece of electro optical material which, in use, supports an optic mode; and
shaping at least one of the metallic electrodes to urge the optical mode in the piece of electro optical material away from the at least one of the metallic electrodes.

15. The method of claim 14 further including shaping the other one of the metallic electrodes to urge the optical mode in the piece of electro optical material away from the other one of the metallic electrodes.

16. The method of claim 15 wherein the optical mode is urged away from both metallic electrodes by reducing a cross sectional area of each of the metallic electrodes next to or in the vicinity of the piece of electro optical material.

17. The method of claim 16 wherein the optical mode is urged away from both metallic electrodes by reducing a cross sectional area of the piece of electro optical material next to or in the vicinity of each of the metallic electrodes.

18. The method of claim 14 wherein a cross sectional area of the at least one of the metallic electrodes reduces in size continuously from a point near the piece of electro optical material until a point of contact with the piece of electro optical material.

19. The method of claim 14 wherein a cross sectional area of the at least one of the metallic electrodes reduces in size as a step change from a relatively greater cross sectional area to a relatively lesser cross sectional area at a point near, but not in contact with, the slab of electro optical material.

20. The method of claim 14 further including disposing thin layers of a cladding material between the metallic electrodes and the piece of electro optical material.

* * * * *